(12) United States Patent
Woolston et al.

(10) Patent No.: US 6,856,967 B1
(45) Date of Patent: Feb. 15, 2005

(54) GENERATING AND NAVIGATING STREAMING DYNAMIC PRICING INFORMATION

(75) Inventors: Thomas G. Woolston, Alexandria, VA (US); Paul Andrew Kavitz, Laguna Niguel, CA (US); Cameron David John McEachern, San Carlos, CA (US)

(73) Assignee: MercExchange, LLC, Great Falls, VA (US)

( * ) Notice: Subject to any disclaimer, the term of this patent is extended or adjusted under 35 U.S.C. 154(b) by 0 days.

(21) Appl. No.: 09/422,057

(22) Filed: Oct. 21, 1999

(51) Int. Cl.$^7$ ............................................. G06F 17/60
(52) U.S. Cl. ....................................................... 705/26
(58) Field of Search .................................... 705/26, 27

(56) References Cited

U.S. PATENT DOCUMENTS

| | | |
|---|---|---|
| 5,136,501 A | 8/1992 | Silverman et al. |
| 5,594,732 A | 1/1997 | Bell et al. |
| 5,752,238 A | 5/1998 | Dedrick ........................ 705/14 |
| 5,842,040 A | 11/1998 | Hughes et al. |
| 5,845,265 A | 12/1998 | Woolston ...................... 705/37 |
| 5,864,823 A | 1/1999 | Levitan |
| 5,870,717 A * | 2/1999 | Wiecha ........................ 235/385 |
| 5,878,400 A | 3/1999 | Carter |
| 5,878,423 A | 3/1999 | Anderson et al. |
| 5,890,138 A | 3/1999 | Godin et al. |
| 5,896,379 A | 4/1999 | Haber |
| 5,903,647 A | 5/1999 | Ronning |
| 5,933,813 A | 8/1999 | Teicher et al. |
| 5,946,467 A | 8/1999 | Fletcher et al. |
| 5,987,425 A | 11/1999 | Hartman et al. |
| 6,029,141 A | 2/2000 | Bezos et al. |
| 6,055,573 A | 4/2000 | Gardenswartz et al. |
| 6,061,660 A | 5/2000 | Eggleston et al. |
| 6,123,737 A | 9/2000 | Sadowsky |
| 6,195,647 B1 | 2/2001 | Martyn et al. |
| 6,205,432 B1 | 3/2001 | Gabbard et al. |
| 6,259,699 B1 | 7/2001 | Opalka et al. |

(List continued on next page.)

FOREIGN PATENT DOCUMENTS

| | | |
|---|---|---|
| WO | WO 97/19415 | 5/1997 |
| WO | WO98 19259 | 5/1998 |
| WO | WO98 35469 | 8/1998 |
| WO | 99/06913 | 2/1999 |
| WO | WO99 13417 | 3/1999 |

OTHER PUBLICATIONS

Bunn, Michele D., "Taxonomy of Buying Decision Approaches", Journal of Marketing, vol. 57, No. 1, pp. 38–56, Jan. 1993.*

Voelker, et al., "Mobisaic" An Information System for a Mobile Wireless Computing Environment, publicaiton, 1995, IEEE, pp. 185–190, Seattle, Washington.

Ron Lifton, RND's Ethernet Brouter Family—An Inside Look, Computer Communications, Product Description, vol. 12, No. 5, Oct., 1989, pp 288–294.

(List continued on next page.)

Primary Examiner—F. J. Bartuska
(74) Attorney, Agent, or Firm—Fish & Richardson P.C.

(57) ABSTRACT

An interactive linkage between a search engine and dynamic pricing content available on a computer network can be provided by organizing links to dynamic pricing information (e.g., bid/ask pricing information) on the computer network into a predetermined taxonomy, and providing to the search engine a mapping between search requests and the predetermined taxonomy. The mapping includes reference pointers to dynamic pricing content that can be returned in response to search requests at the search engine. Accordingly, in response to a search request at the search engine, a reference pointer (e.g., an interactive link, a URL, a meta-tag and/or an index into a database) to dynamic pricing information corresponding to the search request can be returned.

20 Claims, 20 Drawing Sheets

U.S. PATENT DOCUMENTS

| | | | |
|---|---|---|---|
| 6,272,474 B1 | 8/2001 | Garcia | |
| 6,282,516 B1 | 8/2001 | Guiliani | |
| 6,292,786 B1 | 9/2001 | Deaton et al. | |
| 6,336,105 B1 * | 1/2002 | Conklin et al. | 705/26 |
| 6,336,138 B1 | 1/2002 | Caswell et al. | |
| 6,377,937 B1 * | 4/2002 | Paskowitz | 705/26 |
| 6,397,212 B1 | 5/2002 | Biffar | |
| 6,415,270 B1 | 7/2002 | Rackson et al. | |
| 6,427,132 B1 | 7/2002 | Bowman-amuah | |

OTHER PUBLICATIONS

Nishara, et al., "A new Scheme of Connectionless Transmission over ATM with Scalability and Cut–Through Tecnique", XVI World Telecom Congress Proceedings, pp. 199–206, Publication date Sep. 21, 1997.

Eric Birenbaum, Add–On Encapsulation for Router–Based Networks, Product Leadrs/Internetworking, Data Communications, May 21, 1994, pp 41–42.

Diorio, J.J. Software Industry Debates Pricing, HFD—The Weekly Home Furnishings Newspaper, vol. 0. Mo. 0, p s10, Jun. 28, 1993.

Senior, A., Northern Trust Adds Forex on Web for Custody Clients, American Banker, vol. 164, No. 119, Jun. 23, 1999 (p. 9).

Promo, A Question of Will, Gale Group, vol. 0, No. 0, p. 210, Jul., 1994.

Tyson, D.O. On–Line Services, American Banker, vol. 151, No. 80, p. 19, Apr. 23, 1986.

BytePro zeros in on channel to sell new software, Computer Reseller News, No. 693, p. 69, Jul. 22, 1996.

Maddox, K. Oracle's push—Selling through the Internet, Interactive Age, vol. 2, No. 6, p. 1, Jan. 16, 1995.

Ge Commits to Quick Response Dealers get opportunity to check firm's stock around the clock; deliveries within 48 hours. HFD The Weekly Home Furnishings Newspaper, vol. 0, No. 0, p. 105, Aug. 5, 1991.

Ng, M., Tool Time, Travel Agent, p. 68, Aug. 7, 1997.

Donaldson, D. Netting sales. Use of Internet in retail trade, Do–It–Yourself Retailing. vol. 44, No. 2, p. 5, Feb., 1998.

Kay, E., Flexed Pricing, Datamation, vol. 44, No. 2, p. 5, Feb., 1998.

Woods, B., Web marketplace—Halsey Minor keynote, Newsbytes, Apr. 12, 1996.

Krantz, M. Custom–Designed Ads, Marketing Computers, vol. 0, No. 0, p. 8, Oct., 1993.

Kramer, S.D., More MSO's use web sites but how well, Multichannel News, vol. 20, No. 25, p. 40, Jun. 14, 1999.

Samit, M. Letting Prospects Sell Themselves, Marketing Computers, p. 73, Apr., 1997.

Free Net Nanny Filtering Software Offered with Norton Utilities 4.0 During Six Week on–line Retail Promotion, PR Newswire, May 26, 1999.

* cited by examiner

```
255.100      = travel category
255.100.1    = travel.air topic
255.100.11   = travel.air.domestic sub-topic
255.100.111  = travel.air.domestic.american airlines 255.200       = retail
255.200.1     = consumer electronics
255.200.2     = clothing
255.200.3     = appliances
255.200.31    =    "         .washers
255.200.32    =    "         .dryers
255.200.33    =    "         .stoves
255.200.333   = retail.appliances.stoves.gas
255.200.333.3 = retail.appliances.stoves.gas.viking brand
```

FIG. 11

GENERATING AND NAVIGATING STREAMING DYNAMIC PRICING INFORMATION

The present application is directed to Internet navigation paradigms, data organization, click flows and relationships between the source of origin of goods in commerce and web sites that display information about goods and services available on the Internet. More specifically, the apparatus and methods disclosed herein provide a new way to organize and provoke participation in bid/ask or dynamic pricing systems available on the Internet and private networks through taxonomic, branding, navigational and participatory techniques.

BACKGROUND

Electronic commerce on the Internet generally can be organized into two categories, database driven applications and indexing or information portal services. Database driven applications can be further categorized as either transactional or non-transactional applications. Auction sites such as ebay™ are non-transactional database driven applications in that transactions are external to the ebay system and between third party participants that use the system, i.e., ebay as a web site and on-line commerce application does not process payment information or require payment information to participate in the system. Ebay type non-transactional systems are a source of dynamic pricing information.

Transactional database driven applications, among others, such as those disclosed, in U.S. Pat. No. 5,845,265 to Woolston, provide that a site may process payment information associated with the transaction and may further provide surety to the Internet customer that the site is providing transactional and/or performance assurances about participants in the system. Transactional database driven applications are also a source of dynamic pricing information.

Both non-transactional and transactional systems are database driven applications that contain dynamic pricing information in a database that is encouraged to rapidly change—that is, the content about the item for sale or offers to buy, or bid are stored in a database and not, for example, in a static web page format. These systems are dynamic in that the database content, for example, a bid at an auction, is or is encouraged to rapidly change. Further dynamic information content is provided by the transient nature of the dynamic transactions themselves, i.e., an auction for a particular item eventually terminates and bid and ask pricing for a particular good or service eventually expires.

The dynamic nature of such database driven web sites present an indexing problem for the second category of electronic commerce related site such as the search engine or information portal. Take for example the Yahoo™ or Altavista™ search engines which, in general, use web crawlers to search the web for indexable content, such as static web pages. Owing, at least in part, to the large and expanding amount of information available on the web, it is understood that its takes even the most efficient web crawler based system several days to crawl and index the resources on the web. Thus, the problems associated with indexing a database driven application are two-fold. First, the database must be subject to a properly formed search request to retrieve the content of the database. Second, the content in database driven applications is dynamically changing, i.e., a link to an auction in progress, for example, may have terminated and may present a dead link soon after a search system indexes the information. Furthermore, the content of the database presents an instance of dynamic pricing which changes too rapidly for an informational portal to index by conventional methods.

Some attempts have been made to ameliorate the problem of indexing dynamic pricing information, such as allowing individual participants to index information at the informational portal site to point to dynamic content at a database driven application. Another attempt to ameliorate the indexing problem is through private arrangement between the operators of a database driven application and the informational portal site to index dynamic content through application program interfaces. This piecemeal approach is not automated outside of private relationships, if they exist, and still presents the problem of dead links and the like after an auction is complete or a bid dynamically changes or expires. Furthermore, the piecemeal solution does not provide a systemic way to solve the fundamental problems that arise in indexing and searching for instances of dynamic data.

Another class of web sites, the so-called comparison shopping sites or bots, attempt to address the dynamic content indexing issue by imposing another layer that purportedly bridges multiple dynamic shopping sites. These sites require a search request be entered at the central site and the search request is parsed and distributed to multiple sites in a predetermined search format. These sites, thus, purport to make the searching process more efficient by automatically searching a plurality of sites. This type of comparison site, however, does not address the fundamental problem of indexing dynamic content to populate search services for indexable searching by participants. In contrast, they merely impose another layer of complexity on top of multiple dynamic pricing systems.

Another class of services that attempts to address the problem of dynamic pricing information is found in the financial art such as U.S. Pat. No. 5,136,501, to Silverman and assigned to Reuters Limited and its family of related patents. This technology does not address the problem of indexing non-financial instances of dynamic pricing and it does not present a consistent navigational or taxonomy scheme to navigate and find pricing information in a heterogeneous computing environment and found on the Internet, i.e., the Reuters system uses private relationships between the parties to exchange information about dynamic pricing.

SUMMARY

The systems and techniques described here are capable of addressing these and many other problems presented by dynamic content by placing a dynamic navigational taxonomy between dynamic content sources and conventional search engines and, thus, making available a fixed or stable point of reference for indexing by conventional search engines while organizing dynamic pricing information into a navigation taxonomy. The present systems and techniques may also employ a taxonomic concentration feature, e.g., the ability to concentrate dynamic pricing information from multiple sources into an organized taxonomy of subjects to provide a micro-narrow cast of information for a particular good or class of goods and services that may be of interest to a participant.

The present systems and techniques may also provide a way to establish a "functional brand"—e.g., a function that designates the source of origin of a particular class or type of goods and services associated with the function, that may co-exist with and enhance famous brands or rapidly establish associated niche brands through a consistent functional branding scheme.

The present systems and techniques may also provide a new way to employ conventional telecommunication switch and routing equipment, e.g., conventional routers, to massively parallel process dynamic content into a useful taxonomy of content-sensitive streams of information.

The present systems and techniques may also provide a novel utility for monitoring a particular good or delineated class of goods or services, while the monitored content dynamically changes, and thereby reduce the hit load on the source of dynamic pricing by engrafting a point-to-multipoint communication structure to efficiently monitor and distribute information about dynamic content to multiple users.

The present systems and techniques may also provide a novel revenue stream by providing a prioritized way to stream continued bid/ask information.

The present systems and techniques may also provide a new target channel based on the subject matter of interest for the distribution of electronic coupons and advertisements.

The present systems and techniques may also provide a novel stream of information created by data mining techniques hereafter referred as "broadcast data mining".

The present systems and techniques may also provide novel loyalty programs and contests to keep a participant interested in continuing to participate in the system.

The present systems and techniques may also provide a novel way to index items for sale that utilize the Universal Product Code (UPC) inventory and tracking scheme into the new dynamic taxonomic navigation and provides a further use as a source of information to update conventional search engine databases about the availability and pricing of inventory.

The present systems and techniques may also provide a new way to rapidly compare pricing or bid/ask information from multiple sources.

BRIEF DESCRIPTION OF THE FIGURES

FIG. 5 may also depict niche or sector brands as co-existing and being enhanced by the functional navigational brands that index the niche or sector brands.

FIG. 11 may further depict one of the many possible taxonomic encoding schemes possible in the system.

DETAILED DESCRIPTION

Figure 1:
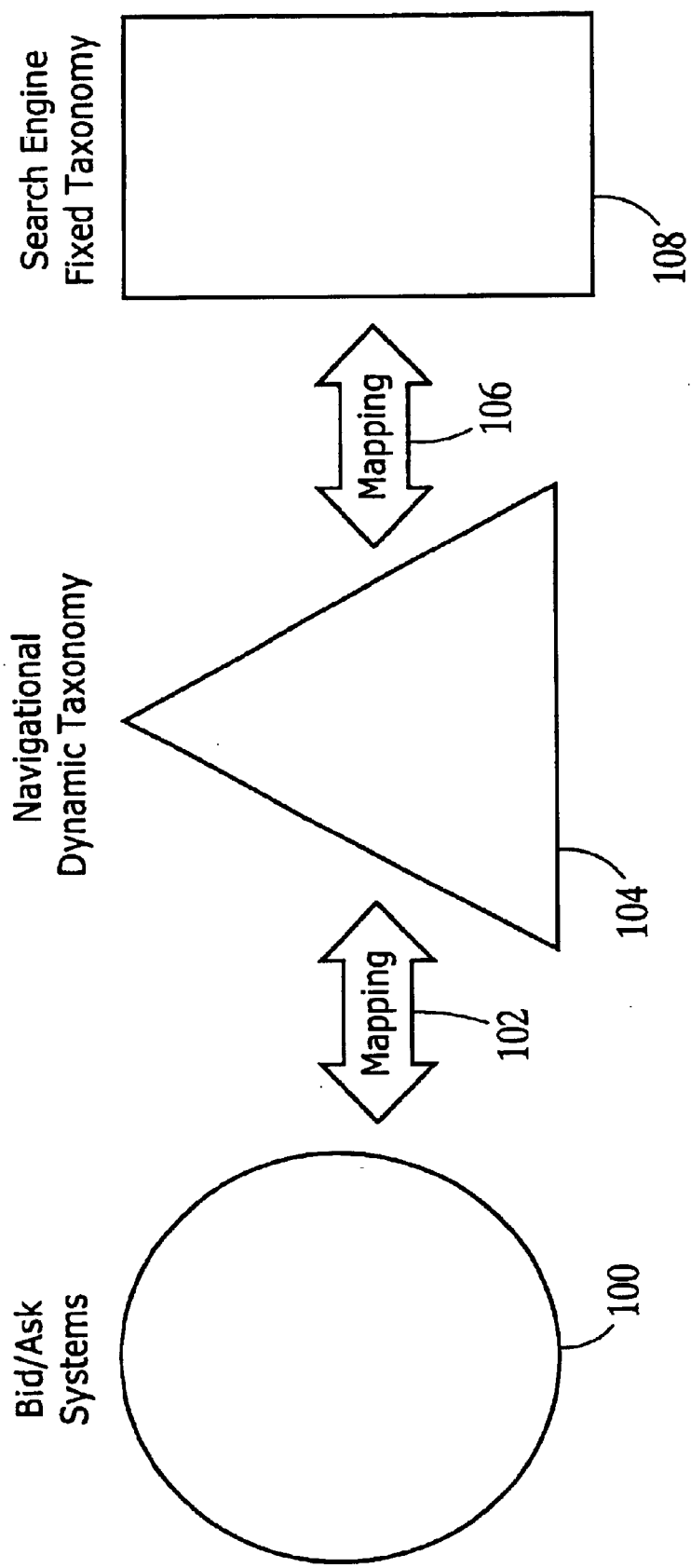
FIG. 1 depicts a high level view of how a new navigation dynamic content taxonomy may map dynamic content available at dynamic pricing systems, e.g., database driven applications, shown as the circle, through the new navigational dynamic taxonomy, depicted as the upright triangle, to provide fixed, stable and indexable points of reference, e.g., URL addresses and meta-tags, to search engines, as depicted by the rectangle.

The system disclosed herein may provide a new way to navigate dynamic content by presenting dynamic data in a streaming navigable and relational format and by building navigational portals based on a building block of modular computer programs called navlets. Thus, the system may provide an organized way to present categorized and navigable information with a new class of application programs built on navlets or employing a single navlet.

Another aspect of the system is a reduced reliance on, or elimination of, databases to access, or access indexes or links to, navigable content or content subject to rapid pricing changes as may be available on the Internet or from private networks. Here, for example, the system may index content and make it available for access through the dynamic mapping and taxonimizing feature of the system by the re-purposing of high speed routers into a taxonomising and content providing engine, thereby eliminating the necessity of separately searching information portals to find instances of dynamic pricing.

Another aspect of the system is its ability to concentrate data from multiple sources based on a dynamic and navigable way to organize and classify dynamic pricing based on the content of the information. Here, for example, the system may concentrate bid and ask information from multiple market makers or markets or auctions into a stream or streams of organized bid/ask data that is navigable down to a useful, or user-desirable, stream of data. In one illustrative example, the over-the-counter (OTC) stock market may have multiple market makers or multiple markets present that maintain different bid/ask prices for the same OTC stock. The system may place the entire OTC market for stocks into a navigational taxonomy based on multiple or single threaded criteria such as industry sector in which the OTC listed company operates as taxonomized by Standard Industry Codes (SIC) as published by the United States Department of Commerce or other well-established ways to organize companies by the respective sectors in which they operate. Here, a taxonomic hierarchy may begin with sector categories followed by sector topics, sector sub-topics, down to individual stocks. Navigating down through the hierarchy, the participant may navigate down to a particular stock of interest. The taxonomic concentration feature of the system may provide streaming bid/ask information from the specific identified stock from multiple markets and multiple market makers in a single stream of bid/ask information. If the user is buying stock they may select the most appropriate ask price. If the user is selling stock they may select the most appropriate bid price.

Another aspect of the system is the ability to program a profile into the system to monitor specific targeted bid/ask occurrences available at private exchanges, public exchanges or database driven applications available on the Internet or through private networks through a navlet queuing system.

Another aspect of the system integrates a loyalty program to encourage participation and use of the navlet.

Another aspect of the system allows one participant to send a navlet to another participant to further encourage use of the navlet.

FIG. 1 of the system may present a high level overview of the taxonomic navigation and indexability of the system. Bid/ask or dynamic pricing systems (the terms bid/ask and dynamic pricing may be used interchangeably herein) available on the Internet or on private networks may be represented by the circle 100. These bid/ask systems may be independently operated, may provide only participant access, e.g., a web page output, or may be linked to the dynamic navigational taxonomy via an application program interface or a system level messaging interface. These bid/ask systems 100 may be retail systems, auction systems, dynamic trading systems or other sources of pricing information. The mapping function 102 may classify bid/ask information available from bid/ask systems 100 into a predetermined or dynamic classification taxonomy. Here, the taxonomy may be a predefined generally accepted way to classify or organize goods and services by category, topic and sub-topic. For example, a consumer electronics product, such as a home theater receiver with AC-3 decoding, and a source of origin of the good may be used to place the home theater receiver into the consumer electronics category, home theater receiver AC-3 decoding topic, a brand sub-topic and a model number sub-sub-topic to classify the product. The product may further be available at a specific uniform resource locator (URL) or other uniform resource identifier (URI) address at a specific bid/ask system such as hotbuys.com or an auction system such as ebay™. The mapping function 102 may further provide a short name for the product such as "Sony RX-200" and extract the bid/ask price for the product such as $300 using conventional data parsing techniques or processing extensible markup language (XML) tagged information. The short name, bid/ask price and URL may be mapped into a navigation dynamic taxonomy 104. The navigation dynamic taxonomy may use predefined dynamic navigational linking to provide a way for participants to navigate dynamic bid/ask content through category, topic, and sup-topical relationships to locate a data steam of interest. Here, by way of further example, a participant may navigate dynamic streams of data from a category such as consumer electronics, to a topic such as home theater receivers with AC-3 decoding, to a brand sub-topic or source of origin for the goods such as Sony. Here, the system may provide reduced data flows as the taxonomy is navigated by the user to the lower levels of the taxonomy. Thus, for example, the Sony receiver product used in this example may be available as dynamic data as Sony RX-200 $300 at the category, topic, sub-topic and sub-sub-topic or brand levels. As discussed further below, navigation of dynamic data may be used by applications such as navlets, and additional applications such as indexing, analysis and search tools. For the purpose of FIG. 1, the dynamic data from bid/ask systems 100 is taxonomy mapped 102 to a navigational dynamic taxonomy 104. The navigational dynamic taxonomy may be further mapped 106 to provide a fixed URL or point of reference for indexing reference by conventional search engines 108. Here, continuing with the illustrative example, the dynamic navigational taxonomy for the consumer electronics, home theater receiver AC-3 decoding, Sony brand, may be indexed to a search engine 108 taxonomy of, for example, consumer electronics, home entertainment systems, Sony brand. Thus, providing a point of reference for a search result at a conventional search engine 108 to return a reference to a point in the dynamic navigational taxonomy 104 that in turn may point to dynamically changing bid/ask data for the products available on the Internet or in private networks 100. The system may provide this bridge between dynamic data 100 and a search engine's fixed taxonomy 108 to help Internet participants locate bid/ask content through conventional search engine techniques.

Figure 2:
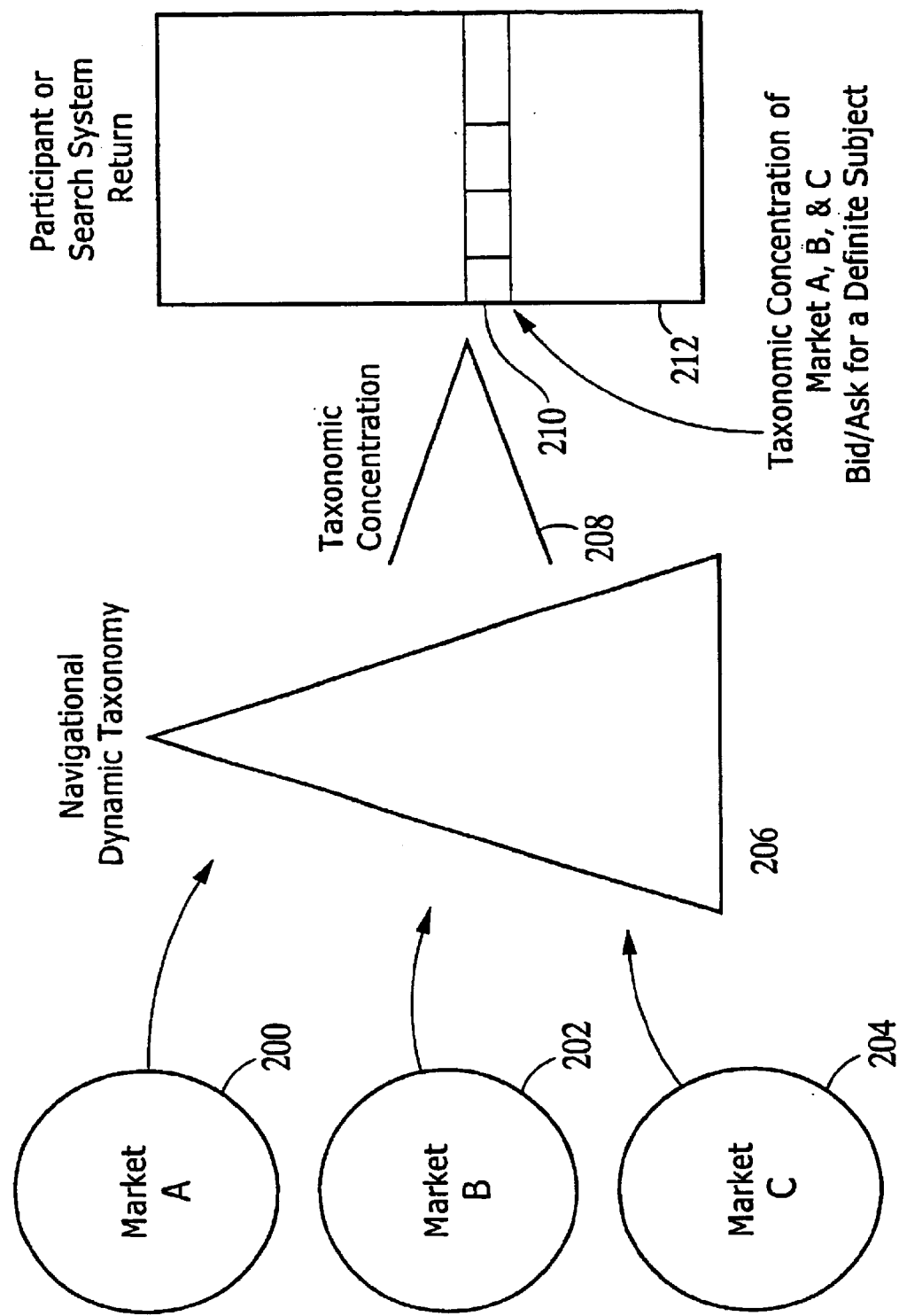
FIG. 2 may represent a high level view of the taxonomic concentration feature of the new navigational dynamic taxonomy. A plurality of database driven or multiple content sources may be depicted by the plurality of circles on the left side of the figure, which may for example, be multiple market makers for the same taxonomic item such as an individual stock. The navigational dynamic taxonomy depicted by the upright triangle may map bid/ask or dynamic pricing information from the multiple market makers or electronic markets into a single or plurality of data streams to provide data concentration from multiple sources, e.g., market or market makers A, B, and C through the navigational dynamic taxonomy which may provide a context-sensitive or indexable point of reference, e.g., a URL address or metatags, for output to a participant or indexing into a search system represented by the rectangle. The method of collecting, classifying and sorting data, as may be inherent in the system architecture, may concentrate bid/ask or dynamic pricing information for fungible or comparable items into an organized and concentrated stream of bid/ask information.

FIG. 2 may provide a high level diagram of another feature of the systems, e.g., taxonomic concentration or, put another way, the system's inherent ability to concentrate bid/ask information from multiple sources of bid/ask information into a navigational dynamic taxonomy. Here, for example, an automobile may be available (e.g., offered for sale) at three distinct markets, auctions or retail establishments, e.g., markets A, B, and C, 200, 202 and 204 respectively. Here, the dynamic navigation system 206 may provide a way to concentrate bid/ask information from multiple sources such as markets 200, 202, and 204 based on a predetermined taxomic category, topic and sub-topic classification criteria into an instance of streaming bid/ask information 208. Here, as in FIG. 1, the navigational dynamic taxonomy may provide a point of reference, a URL or URI 210 and meta-tags for indexing into conventional search engines 212.

Figure 3:
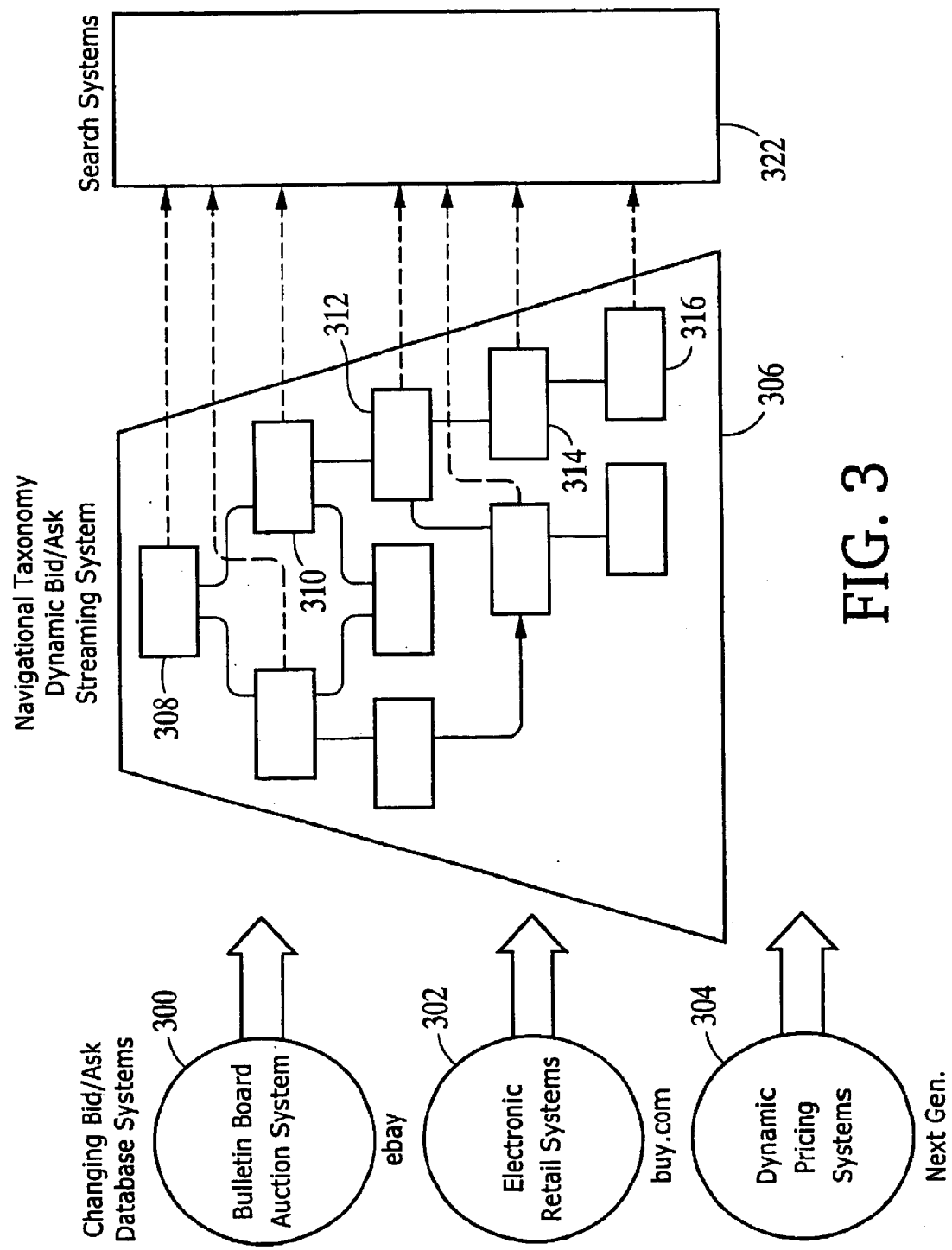
FIG. 3 may depict a further high level representation of how the navigational dynamic taxonomy may provide multiple relationships or navigation relationships in the navigation taxonomy to map dynamic information from a plurality of dynamic pricing systems, such as bulletin board auction systems, electronic retail systems and dynamic trading systems through the navigational dynamic taxonomy, to provide a useful way to locate dynamic content and to provide a way to index the dynamic content into conventional search system as represented by the rectangle.

FIG. 3 may depict a detailed view of the way the system may map different types of bid/ask systems and information from systems 300, 302, and 304 to the navigational dynamic taxonomy 306. Here, relationships may be depicted by an upright triangle shaped taxonomy starting at a root 308, to a category 310, a topic 312, a sub-topic 314 to a sub-sub-topic, brand or source of origin of bid/ask data or goods 316. This diagram may also depict the multiple indexing of dynamic data navigational instances 320 to conventional search engine 322 references or points of indexing.

Figure 4:
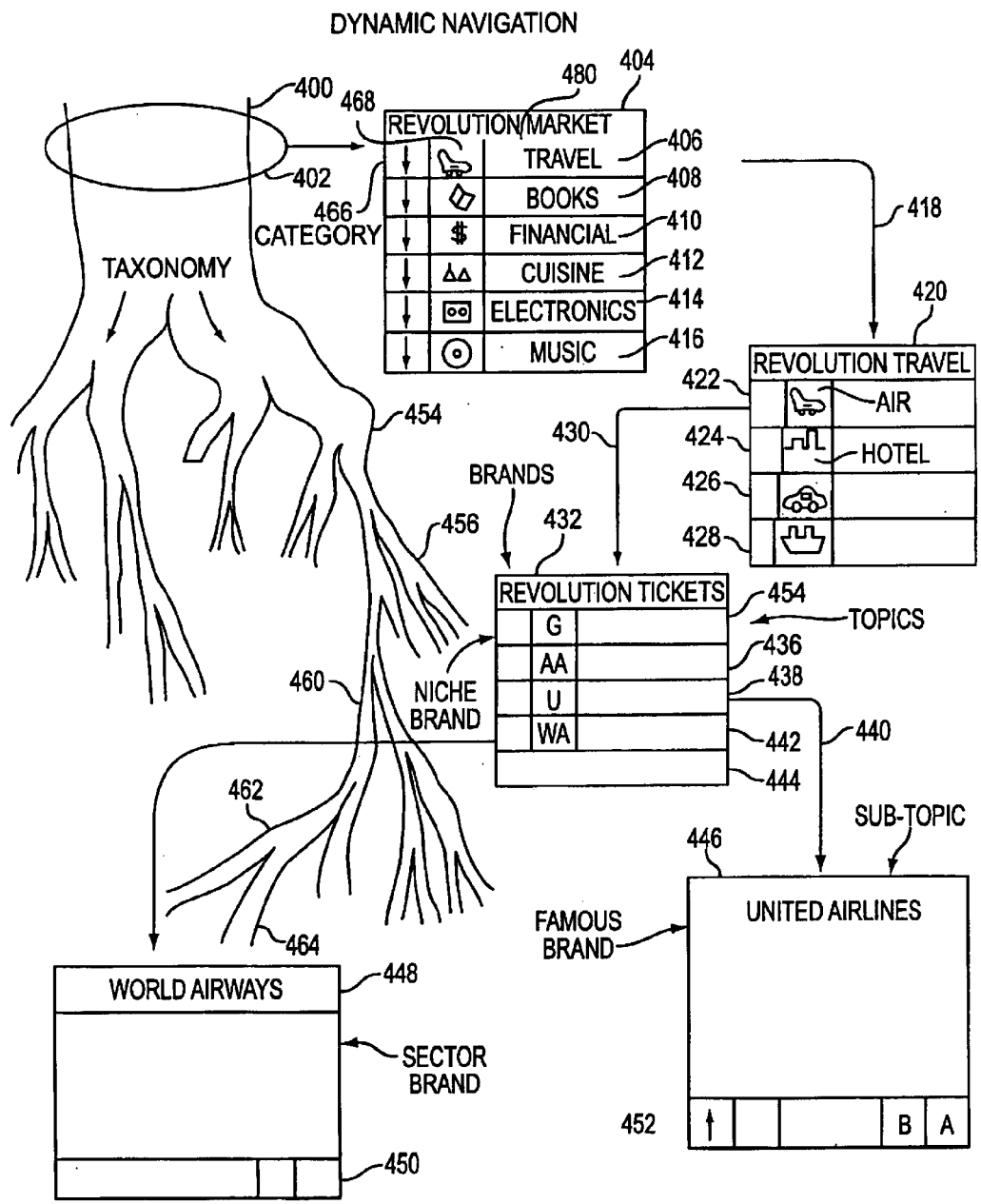
FIG. 4 may depict a navigational taxonomy of the dynamic navigational system. Here, information may be visualized as a tree with many roots and sub roots. The navigational tree in the dynamic navigational system hierarchy may start at a high level that displays streaming bid/ask or dynamic pricing information at a category level, such as travel, books, finance, cuisine, electronics, and the like, and by navigating "down" through the taxonomy, the taxonomy may further granularize into topical classifications such as travel, where travel may in turn granularize into sub-topic classifications such as air carrier tickets, and then to a sub-topical breakout which may further granularize the information down to particular brands or a source of origin of goods or services that may be participating in dynamic pricing systems available on the Internet or private networks. The dynamic information displayed at the brand level, for example, may display streaming bid/ask information from a plurality of bid/ask systems where famous brands may be participating in a variety of bid/ask systems. By establishing a consistent look and feel for the display and functionality of the streaming dynamic pricing in a modular computer program called a "navlet", as described further herein, the navlet provider may establish a functional brand whereby the functionality of the navlet becomes associated in the consumer's mind with a source of streaming bid/ask information and a way to navigate and find sources of dynamic pricing.

FIG. 4 may depict a way in which the navigational dynamic data may be conceptualized, displayed and navigated. Streaming data may be conceptualized as a river of information. The river of information for one particular taxonomy may begin 400, for example, as all streaming bid/ask information generally available on the Internet. This broad range of data may be captured 402 and displayed at a web site 404 that provides links to categories of bid/ask information such as travel, 406, books, 408, financial, 410, and other categorization level materials. Here, for example, categories of steaming bid/ask information may be displayed and utilized by navlets. A navlet may be a small modular component that displays a single stream of information while providing navigational links to additional streams of data or to web sites built upon multiple instances of the navlet. In the example depicted, categorization of streaming bid/ask information may be enhanced with navigational buttons such as a down arrow 466 that may indicate that further granularity of streaming information is available under this streaming data or navlet instance, or through visual queues such as a glyph or small picture (e.g., icon) representative of a point in a taxonomic hierarchy. For example, the travel category 406 may provide all streaming bid/ask data available under the category travel 406 in a streaming window of data 480. In another mode of the system, the streaming data at a category level 480 may represent selected bid/ask data under the travel category. In another embodiment, the category or other levels such as topic or sub-topic levels may be populated with revenue bearing bid/ask information as discussed in the message queuing embodiment as described further below. From the category level 480 the system may provide navigation to finer levels of granularity (e.g., a topic level) through navigational indicators 466 and 468. FIG. 4 may demonstrate an example navigational taxonomy to a travel topic 418 that may display dynamic bid/ask data at the topic level 420. Here, the system may display streaming bid/ask information at the topic level, for example, air-travel 422, hotel rooms 424, automobile rental 426 and cruise travel 428. The system may provide a navigational link 430 to topic level 432. In this example, the system may display bid/ask information from a particular source of origin of goods, services or carriage. Here, for example, at the topic level 432 the system may provide a brand indication of the source of the bid/ask information. The system may further provide navigation to the sub-topic levels 446 and 448. Here, the system may navigate to a branded web site or the web site designated as the source of origin of the branded goods and services 446. For example, a famous brand air carrier 446 may participate in the system by applying an instance of the navigational dynamic taxonomy 452 or navlet at a web site branded by or designated as an on-line source of origin of the products or services 446. Here, the navigational dynamic taxonomy or navlet may provide a way to navigate "up" 453 from the branded site into the navigational dynamic taxonomy 432 which may be built with multiple instances of the navlet. The functionality presented at each instance of the navlet or navigational dynamic taxonomy 452, 444, 442, 438, 436, 434, 428, 426, 424, 416, 414, 412, 410, 408 and 406 may provide a consistent functionality at each level to build an identity in the consumers' mind of a source of origin of the functions performed by the navlet to establish a functional brand awareness in the mind of the consumer. Here, two potential functions that may be identified in the consumers' mind are the ability to navigate a taxonomy and an indication that the source of origin of goods is participating in a bid/ask or dynamic pricing system.

Figure 5:
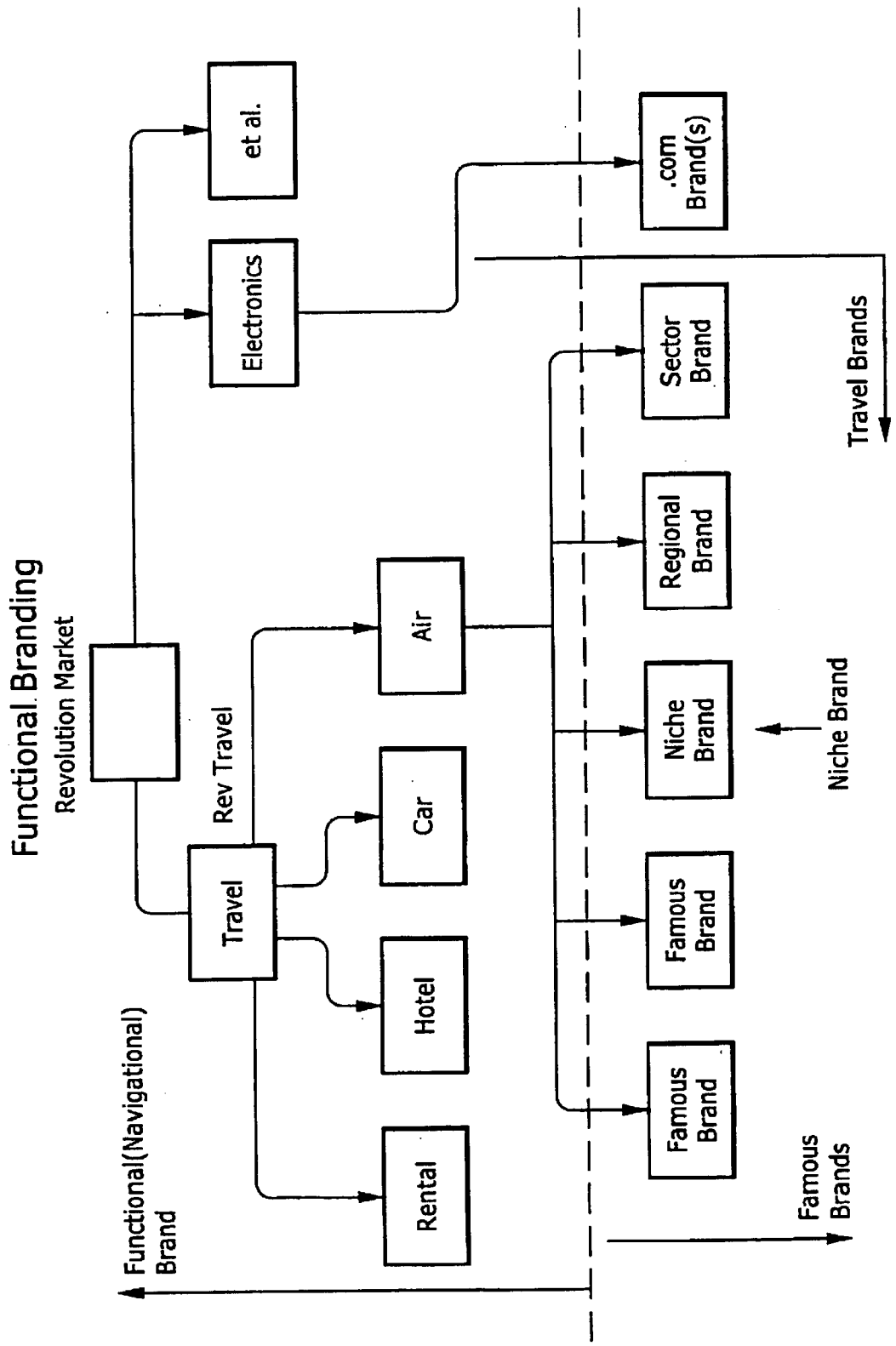
FIG. 5 may depict one of the functional branding techniques employed by the present system, here, functional (e.g., navigational) brands that may co-exist and enhance famous brands that are participating or are indexed by the system.

FIG. 5 may depict a way in which to establish a new type of brand awareness in the consumers' mind, e.g., functional branding.

Functional Branding

Functional branding is a way to associate or otherwise establish the functionality of a recurring functional theme with a way of doing business on the Internet. Here, for example, the recurring functional theme is the vendors' or customers' participation in a dynamic pricing paradigm such as auctions, market maker models of continuous bid/ask pricing, demand driven commerce such as bid.com's dutch auction format, and offer/counter-offer/acceptance type system such as disclosed, inter alia, in U.S. Pat. No. 5,845,265, to Woolston. A method for establishing a functional brand may establish a modular computer functionality to indicate participation by a source of origin of goods in a dynamic pricing system, it may build web sites comprising multiple instances of the modular computer functionality to display goods or services offered in commerce and provide the modular computer functionality to a web site that displays one or more brands. This may be used to create a functional brand awareness in the consumer's mind, e.g., a consistent functionality that indicates participation in a dynamic pricing system where that functionality is a recurring brand theme of a family of web sites. The system may further use the modular computer functionality to provide navigational links to connect to and from the web sites which may use multiple instances of the modular computer functionality provided to the web site that displays a brand. The system may further use multiple instances of the modular computer functionality to provide a navigational taxonomy of subject matter. The system may further provide modular computer functionality in the navlet that undocks the modular computer functionality from a web site that contains the modular computer functionality. The system may further use the navlet or functional branding module to provide a way for a first participant to e-mail the navlet to a second participant. The system may further use functional branding to establish a loyalty program where the navlet can display tokens than encourage entry into contests. The system may further use the navlet or functional branding instances to distribute electronic coupons.

Figure 6:
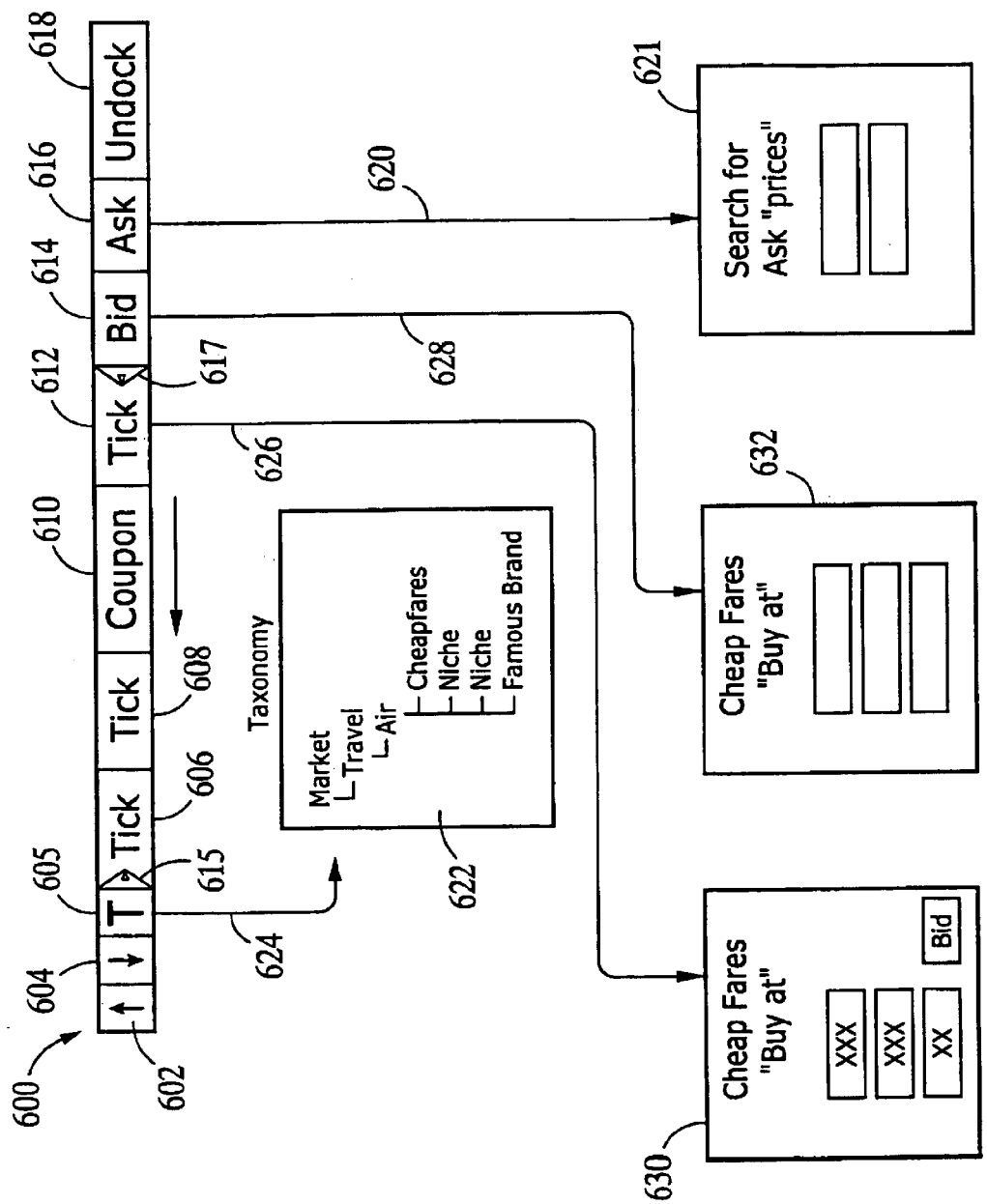
FIG. 6 may depict a functional brand instance or navlet as it may appear at the base of the navigational taxonomy or as linked into a navigational cluster, e.g., a navlet-based navigational portal. Here, navigational linking elements are shown, e.g., the navigation up and down arrows and the "T" button that may invoke a display of a map of a navigational taxonomy to link each navlet into the navigational scheme. Dynamic pricing information that may point to a particular source of origin of dynamic pricing, e.g., a URL or URI, is transduced to streaming information on the dynamic taxomic instance or navlet. An electronic coupon may also be depicted as streaming across the dynamic instance or navlet. Bid/ask and undock buttons are also depicted on this dynamic taxonomic instance or navlet which may provide linkage to brand sponsored bid/ask systems or provide a link to a dynamic pricing data repository.

FIG. 6 may depict an overview of an instance of a navigational dynamic taxonomy or navlet. A single instance of the functional instance of the navigation dynamic taxonomy or navlet 600 may include navigation aids 602, 604, 605 and 622, streaming data denoted as scrolling "ticks" 606, 608, and 612, electronic coupon distribution 610 and instances to bid 614 on an item and instance to search for ask 616 prices and the ability to undock 618 the instance or navlet into an undocked window or frame that may provide a browser window with only the navlet displayed. More specifically, a navigational aid 602 may be represented by an up arrow that may indicate or be an active control to navigate up or from a topic or sub-topic level up to the next higher point in a navigational dynamic taxonomy. Here, for example, the functional instance or navlet may appear at the bottom of a taxonomy at the sub-sub-sub-topic or brand level. By clicking on the up navigation 602 control a URL to a topic level instance, or one level up in the taxonomy of the system, may invoke the execution of a web browser that points to the URL of a web page or display constructed by multiple instances of the navlet at the topic level. See, FIG. 4, topic or combined brand level 432. The navigation aid or navlet 604 may also provide a control to navigate "down' through the taxonomy, here again, 604, it may provide a URL pointing to a resource that displays a return that yields an instance that is further down, e.g., from a topic to a sub-topic level in a predefined or dynamic taxonomy. A further navigational aid on the navlet or dynamic instance may be invoked by the "T" control 605 which may spawn 624 a window 622 that may indicate a text or mixed graphical/text representation of a particular taxonomy navigation scheme. The new or spawned window 622 may provide the ability for the user to select and jump to navigational points in the navigation taxonomy, e.g., web sites built with multiple instances of the navlet or to web sites with a single instance of the navlet. Here, for example, the navigation displayed in the pop up window 622 may provide text that displays the taxonomy while providing URL links to jump the user to points in the taxonomy. The navigational aids may be dynamically programmed by the control type packet or XML tagged messages to the dynamic or navlet instance 600, as discussed further below. Programming of the navigation aid or navlet may be accomplished by loading a register or storage location with a URL of the next point in the taxonomy to place the navlet into the taxonomy.

An instance of dynamic bid/ask information may be depicted at 606, 608 and 612. The instance of dynamic bid/ask data may be represented by a short name such as DC-LAX $350 or 98 Mustang $16, 995 or other such appropriate short names to inform the participant of the type of item subject to bid/ask dynamic or fixed pricing and/or availability. The instance of dynamic information may stream from right to left across the instance 600 of dynamic pricing or navlet. In one mode of the system, the bid/ask information may be organized by the level on the taxonomy on which the information is displayed, which may provide a further context for the short name for the dynamic or availability information to appear. One such taxonomic indexing aid may be provided by a pictogram or glyph that may represent a category or topic in which the dynamic information appears. The dynamic pricing, availability or "tick" information may provide a URL or URI address, string or link to point or direct a web browser or other suitable application to the web address or web site to retrieve the bid/ask or availability information for the item that is the subject of the short name.

The instance of the dynamic stream, the navlet of bid/ask information, may be further propagated or populated with electronic coupons 610 or advertisements, not shown. The electronic coupon 610 may provide a URL link and access code information to unlock or decode electronic coupon information to provide support for discount or loyalty program participation. In one mode of the system the navlet or dynamic bid/ask pricing streaming display may be vertically scaled to support one-half sized Internet advertising placards. In another mode of the system, the navlet may detect the horizontal size of the display on which it appears to horizontally scale the size of the navlet. The system, as discussed further below, may distribute Internet advertising and coupons based on taxonomic, user profile information, or other routable and distribution schemes provided by the system.

The navigation dynamic instance or navlet may provide further active controls to participate in dynamic pricing systems as shown by the bid and ask 614 and 616 controls. The bid control 614 may provide a link to a web page that allows a participant to place a "buy at" or limit type order to bid into a dynamic pricing system. Here, for example, the navigational dynamic instance may appear at the sub-sub-topic or brand level and the bid control 614 may provide a link to a branded web page 632 of a brand participant that is participating in a dynamic pricing system. The bid control may provide a link to a brand participatory dynamic pricing system. In another mode of the system, the bid control may provide a web page for a participant to place a bid whereby the system may post the bid in a bulletin board format and make the information available to further system participants. In another mode, the navlet may provide an application layer frame, whose description below is hereby incorporated by reference, to encode a bid with taxonomic or subject matter information that may be subsequently routed to subscribers.

The "ask" control 616 may provide a link to a web page that allows a participant to search for "ask" prices 620 from a participating source of origin of items or services, or other data repositories such as cache systems or databases that capture the streaming information. This may allow a participant viewing the navigational dynamic instance to research ask and/or current ask prices at a participating dynamic pricing system with multiple suppliers or to perform a search by passing source parameters to the participating system linked to the supplier at the brand level 620. This may provide the system with access to historical pricing information or as a way to research availability. This may also provide the system with a unique database architecture which dedicates a database to capture data that has been organized by the taxonomic data streams. Thus, a database may be dedicated to a particular taxonomic subject and a plurality of databases may be employed to capture data based on the taxonomically organized data flows where each database may be organized to optimize search and retrieval of information based on the taxonomic organization. Here, a search system front end may be applied to this database architecture to direct a search request or to guide a participant to the appropriate database to issue a search into a database dedicated to the subject matter of the search.

The navlet instance 600 may provide an undock control 618 to provide an ability to quickly undock the navigational instance or navlet from a participating web site to create a stand alone frame or application of the navigational instance that is separate from the web site or browser application. In the un-docked mode, the navigational dynamic instance or navlet may exist without a browser application or within an appropriately sized browser frame while maintaining contact with a server that may provide dynamic content for the navigational dynamic instance or navlet.

The navlet may further provide scrolling tools 615 and 617 to "rewind" or reverse 615 the streaming bid/ask information 614, 616 or speed up the crawl 617 of the streaming dynamic information from a data buffer in the navlet.

Figure 7:
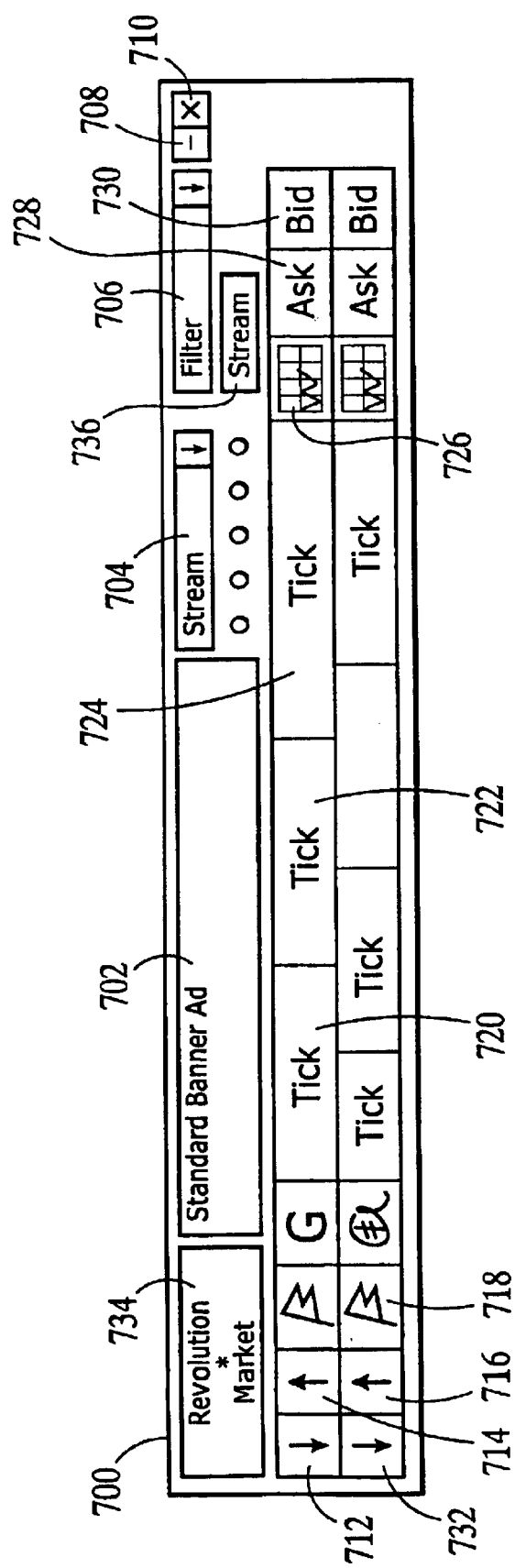
FIG. 7 may depict an undocked instance of functional branding or navlet where the streaming taxomic instance may be undocked from the navigational taxonomy and framed with independent navigation and filter aids, e.g., a complex navlet.

FIG. 7 may depict an enhanced version of the navlet in an undocked or application mode. In this mode the dynamic instance or navlet may be an application program specific to the target operating system or an interpreted language for transportability across operating systems platforms such as that provided by the Java programming language. Here, instances of streaming bid/ask or retail information may be framed 700 in an application program or enhanced navlet. The application 700 may provide an index back to the top of the navigation taxonomy 734, a window to receive banner advertisements 702, pull down navigation aids 704, a filter feature to provide user programmable filter or alarm preferences 706, standard minimization 708 and close controls 710, a control to open windows to additional instances of dynamic streaming data 736, instances of streaming navigational data 712 and 732, links to analytical tools 726, navigational aids 712 and 714 as described above and incorporated by reference herein, streaming instances of short names that link to bid/ask or retail points on the web 720, 722 and 724 and bid/ask controls as described above and incorporated herein 728 and 730.

Figure 8:
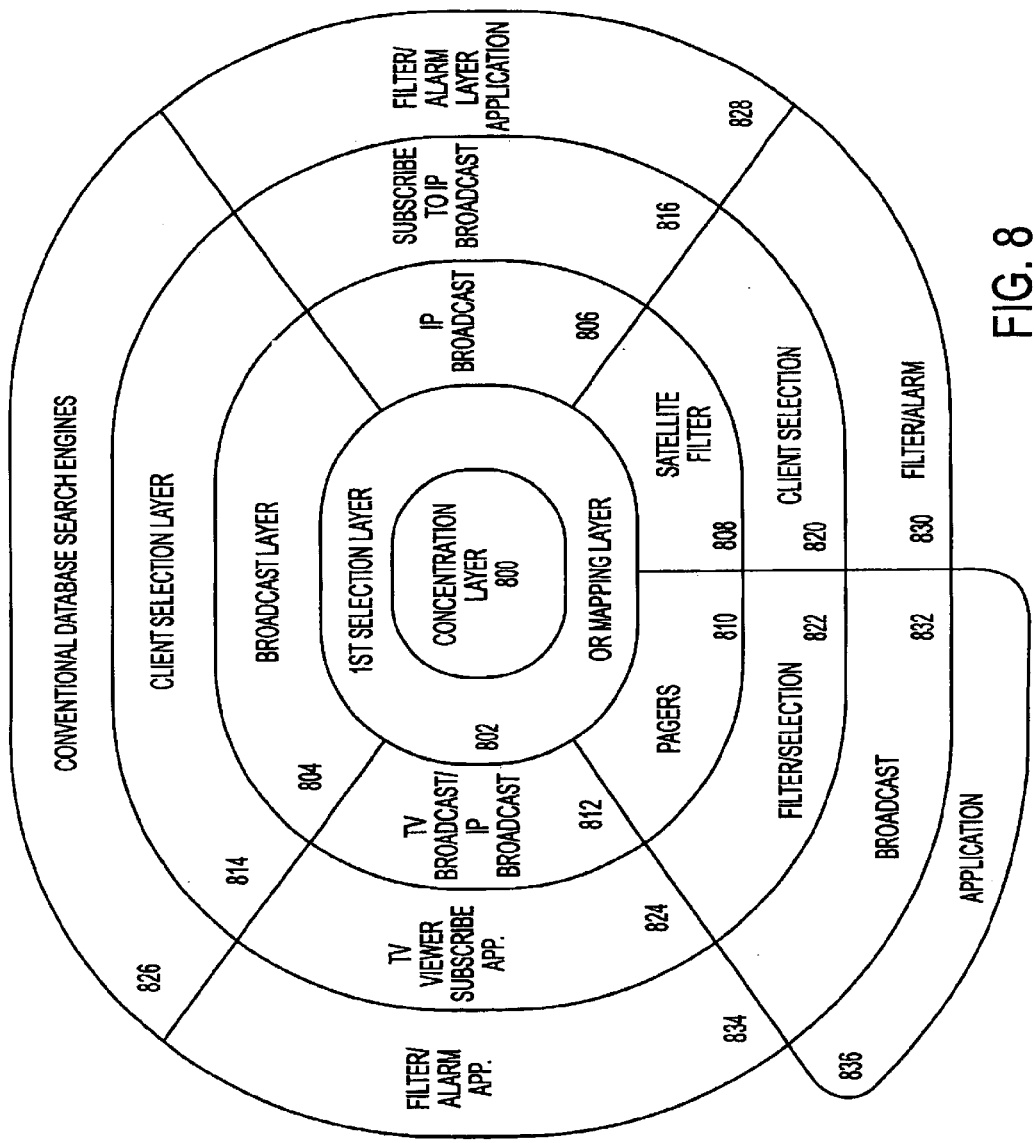
FIG. 8 may depict a high level overview of how micro-narrow cast channels or a diagram of the data flows which may create a dynamic navigational taxonomy built on navlets beginning with a concentration layer, a first selection or channelization layer, to a broadcast layer, to a subscriber layer, to a filter/alarm layer for a variety of information appliances including a web browser or other computer participant applications.

Turing now to FIG. 8, the system data flow may be depicted as concentric rings of information processing and functions. At the core of the system may be a data concentration layer where bid/ask information from the Internet and private networks may be concentrated to a broadcast physical or virtual broadcast medium. Here, an application layer framing protocol may be encapsulated to transport bid/ask data to a concentration layer 800. At the concentration layer, the transport encapsulation may be stripped and the application layer framing protocol may be placed onto a physical broadcast medium, as described further below, to concentrate and queue data onto the broadcast medium such as an Ethernet, broadcast ATM, FDDI or SONET or other suitable high speed backbone that may support point-to-multipoint transmission and, in the preferred embodiment, flow control the data flow from the send modules. In one mode of the system, the interface between the concentration layer 800 and the first selection layer 802 may be a private network or virtual private network wherein an IP source and/or destination address for a UDP packet or other suitable packet type may be assigned an address that correlates to the application layer framing protocol encoding to represent an information category for classifying and filtering data from the concentration layer 800 to a predetermined or dynamic taxonomy of information classification. Thus, the interface between the concentration layer 800 and the first selection or mapping layer 802 may rapidly sort, classify and channelize bid/ask information by using an application layer framing protocol that provides broadcast or multicast suitable packets that can be filtered and routed by conventional high speed routers. The first selection layer may then encapsulate the application layer framing protocol for transport to a plurality of broadcast or multicast protocols such as IPv6 or IPv4 broadcast or multicast 806, satellite selection interface protocols 808, a pager protocol interface 810, a television/IP broadcast system 812, or other broadcast layer protocol or functional equivalents 804. The IP broadcast 806 protocol may use convention IP broadcast or multicast techniques such as IPv6 multicast or the RTP/RSVP IPv4 protocols suitable for transport to support point-to-multipoint protocols to subscribe or open to a multicast session with an IP multicast or broadcast server 806. In one mode of the system the IP RTP/RSVP server may be incorporated into the router.

A filter/alarm layer application 828 may strip the transport protocol used by the IP broadcast to process the application layer framing protocol and the dual use IP addressing scheme, discussed further below and incorporated herein by reference, to filter bid/ask data and trigger alarms to alert the user based on predetermined criteria.

In another use of the system, the first selection/mapping layer 802 may transport sorted and classified bid/ask data to a broadcast layer 804 that may encapsulate and transport the taxonomized data to a client selection layer 814. Here, the client selection layer 814 may be a conventional search engine that may use the streaming taxonimized bid/ask data to rapidly update database information 826 with current dynamic pricing data, thereby providing a way for conventional search engines to rapidly update dynamic pricing data using the system. In another mode, the taxonomic streams of data may be captured by databases dedicated to each category or of topic of information thereby providing a unique database architecture to support massive data storage of dynamic pricing information.

In another interface mode of the system, a satellite broadcast filter layer 808 may be used to select taxonomic bid/ask information at the uplink or land earth station (LES) side of a satellite broadcast path. Here, a client selection application/protocol 820 may be used to select streaming bid/ask information at the LES for broadcast to downlink receiver applications 830. In an alternative mode, the satellite filter application may broadcast popular streaming bid/ask information for an overlay of an instance or multiple instances of navigation dynamic bid/ask information that may be used with navlets executing on devices connected by the satellite transmission.

In another interface mode of the system a TV broadcast/IP broadcast 812 carrier may be used to transport streaming bid/ask data to conventional television or digital television receivers. Here, conventional vertical blanking interval (VBI) communication techniques may provide a carrier for the streaming bid/ask data or MPEG transport protocol techniques may be used to provide a data and transport path for the streaming bid/ask data. A TV viewer/subscriber application 824 may be used to execute a navlet to display and navigate the streaming bid/ask content. A filter/alarm application may be executed in conjunction with the navlet, or integrated in the enhanced navlet, to provide automatic or semiautomatic filter and alarm conditions for the streaming bid/ask content. Invoking the bid/ask content may invoke a World-Wide Web (WWW) browser application on the television enhancement device such as provides by WebTV™ or an integrated browser application as found in digital television receiver/processor designs.

Figure 9:
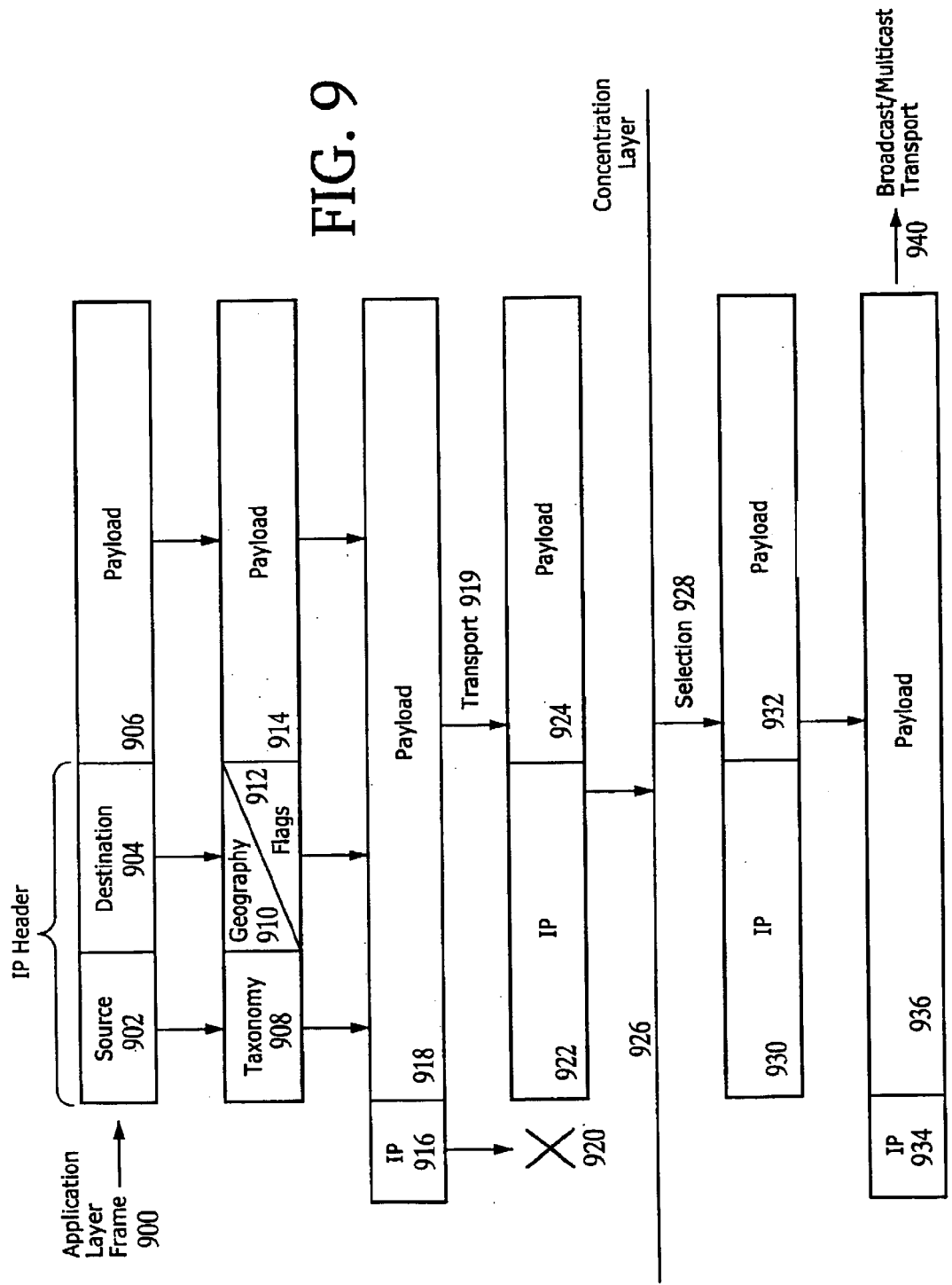
FIG. 9 may depict one way in which to construct a Simple Network Ask Packet (SNAP) application layer frame as may be employed by the system and used by the navlet building block. Taxonomic information may be encoded into a standard switchable or routable address in a format supported by conventional routing or switching devices, and the SNAP may be encapsulated for transport to the SNAP routing or switching fabric at the nexus of the concentration layer and topical selection layer of the system. Encoding the taxonomy into a conventionally supported address field of a well-supported protocol may allow the system to economically re-purpose commercially available router devices into a massively parallel context-sensitive channelization or micro-narrow cast system.

FIG. 9 may provide an example of the novel dual use IP addressing scheme that may be employed by the system. The packet shown in FIG. 9 may provide an example of a Simple Network Ask Protocol (SNAP) that may be used by the system and the navlets. The SNAP may be an application layer framing protocol that may be used to communicate between an application source of bid/ask information and a navlet application that may display and navigate streaming bid/ask information. Here, however, the dual use IP addressing scheme may also provide a mechanism for re-purposing a conventional IP router into a streaming bid/ask categorization, sorting and broadcasting device.

Figure 10:
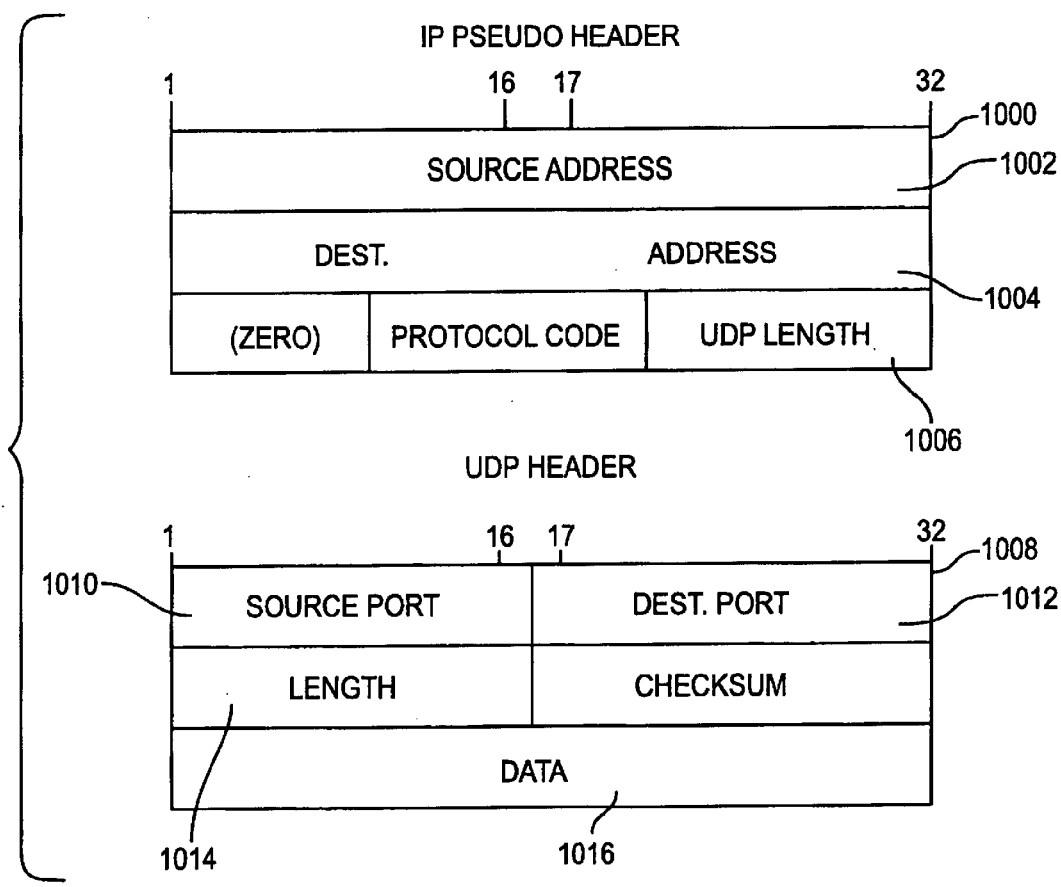
FIG. 10 may depict a further breakdown of one possible SNAP format further encoding taxonomic or meta-data information about the bid/ask or dynamic pricing payload for use with navlets and other applications.

FIG. 9 may depict one example of a suitable encapsulation scheme for use in the system. The SNAP for use in the system may begin with the construction of an application layer framing packet that uses a standard unit of IP communication such as a UDP packet to encode information about the payload (bid/ask or dynamic pricing data) into the source or destination data field for the IP header of a UDP packet to place the packet into a predetermined taxonomy or hierarchal classification of bid/ask information. Here, taxonomic information, referring to FIG. 11 for an example classification scheme, may be encoded into the IP source or destination address 902, 904 to provide classification information, e.g., metadata data about the payload, for the payload 406. The destination or source IP address field may be used to provide additional information about the payload such as geography information that may be relevant to the payload, such as an airport of origination for an air carrier fare 910 and flags 912 to specify further information about the payload, such as expiration time of the bid/ask information. The application layer frame or SNAP may be encapsulated into an IP packet 916 and 918 for transport to the information concentration layer. After transport 919 to the concentration layer, the IP encapsulation packet 916 may be stripped 920 and the application layer frame or SNAP may be placed into the concentration layer 926. Here, the taxonomic information encoded in the IP address of the SNAP may be acted upon, directly, by conventional and commercially available routers to provide a selection of bid/ask information based on the taxonomic classification, geography and flag information encoded in the IP address 922. Thus, the selection 928 of bid/ask information in the system may use commercially available routers, such as those provided by Cisco Systems, Inc., to provide an extremely fast and economical method of concentrating and distributing bid/ask information from a plurality of heterogeneous sources and sorting the bid/ask information into a taxonomy to create a hierarchy of streaming bid/ask information. The SNAP IP 930 and Payload 932, now sorted into a taxonomy scheme, may be re-encapsulated 934 and 936 for transport to a plurality of navlets or other applications. Here, the system may use one or more protocol schemes that support multicast or broadcast transmission of streaming data. Thus, the system may provide a taxonomic broadcast of bid/ask information that may be navigated by navlets, or used by other application programs for database injection to provide a useful and economical way to search and/or index bid/ask information. The SNAP or application layer frame may use the source and destination data fields to create an IP pseudoheader, see FIG. 10, to encapsulate UDP packets where the pseudoheader is encoded with taxonomy, geography, flags and other meta-data type information for the UDP data payload to create SNAP frames for use by the system.

Figure 12:
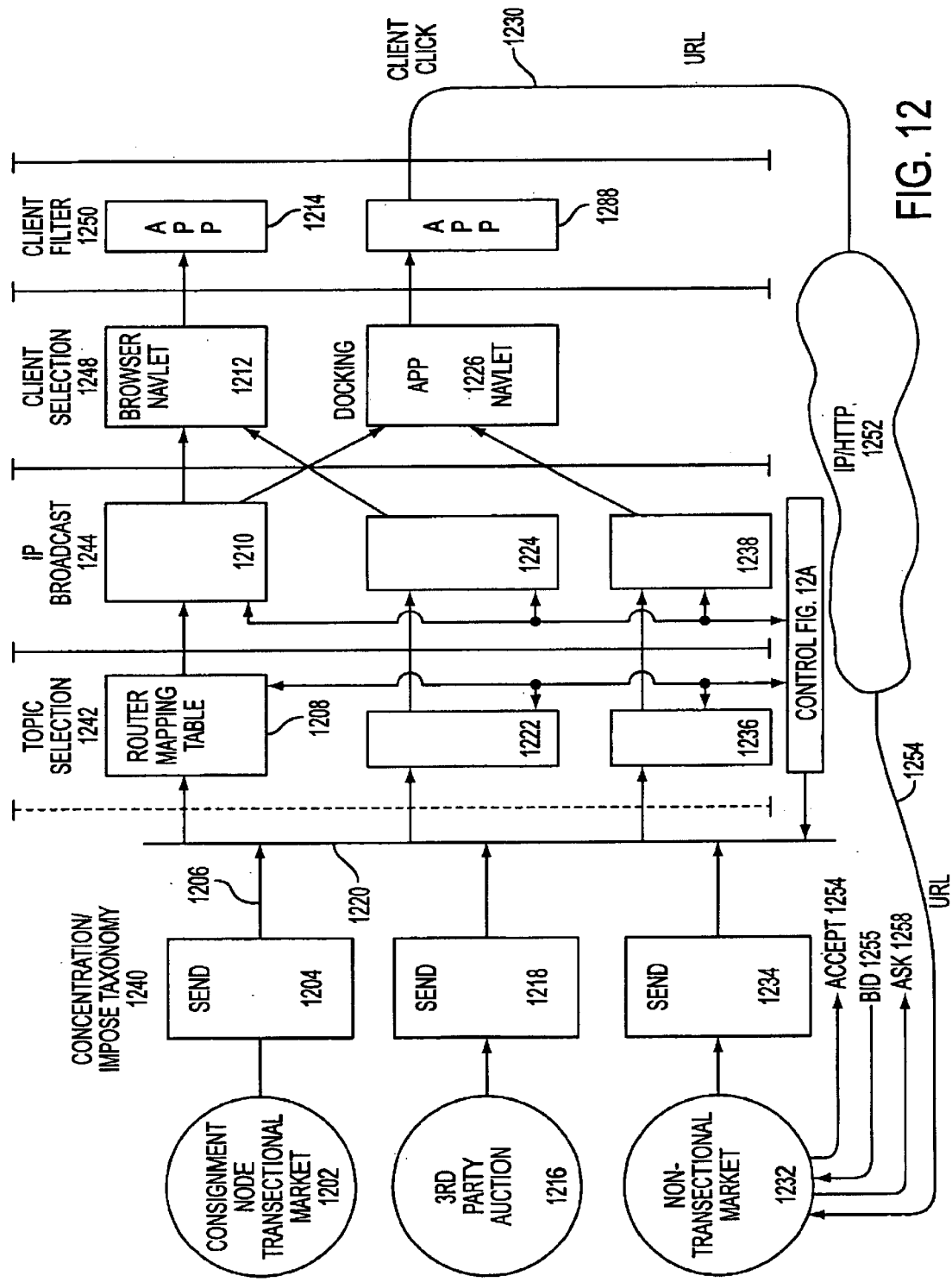
FIG. 12 may depict a block diagram of a concentration and channelization method that may be employed by the system.

FIG. 12 may depict an embodiment of the system as deployed for use with the Internet. The system may be organized as a concentration/impose taxonomy stage 1240, a topic selection or taxonomic organization stage 1242, and IP broadcast/IP multicast transport stage 1244, a client selection or navlet selection stage 1248 and client filter/alarm 1250 stage. At the concentration stage 1240, the system may impose a taxonomy onto the plethora of bid/ask information available from a plurality of bid/ask systems. These systems may include transactional markets 1202, and auction system 1216 or non-transactional system such as auctions and retail systems that do not process transactions 1232. The system may input data with send applications 1204, 1218 and 1244. The send applications may execute in conjunction with the database systems associated with the sources of bid/ask information 1202, 1216 and 1232. The send application may also reside on a server system that probes the databases and web pages available at sources of bid/ask information 1202, 1216 and 1232. The send application may also reside on a server system that probes the database and web pages available at sources of bid/ask information 1202, 1216 and 1232. The send application 1204, 1218 and 1234 may also be integrated into the database systems and the sources for bid/ask information 1202, 1216, and 1232. The send application may retrieve information from the sources for bid/ask information and place the information into an application layer-framing format, which in one example discussed above, may be a SNAP format. The send application may encapsulate the SNAP frame for transport to the concentration layer backbone 1220. In another mode of the system a router or an application external to the send application may encapsulate the SNAP frame for transport to the concentration layer 1220. Such encapsulation techniques are conventionally supported by a virtual private network configuration of a commercially available router. Thus, the system may also support the dedicated transport of a SNAP frame to the concentration layer with a transparent connection mode such as frame relay and ATM type connections. Thus, in one mode of the system the send application may place the SNAP frame onto a virtual private network or directly onto a private network that supports assignment of an addressing scheme that supports taxonomic encoding and other information encoding in the novel dual use mode of the address fields or packet header as disclosed herein. A plurality of send applications may transport, format and encode bid/ask information to support the concentration layer.

At the concentration layer 1220, a broadcast backbone or a transport fabric that may natively support point-to-multipoint or broadcast transmission may be used to queue and concentrate bid/ask information from a plurality of data sources. Here, for example, the input queues native to a broadcast fabric such as CDMA (code-division multiple access) waits for an open slot for a clear channel on the broadcast fabric. This native queuing and flow control structure may be used by the system to provide flow control for the send application and/or to concentrate bid/ask data from multiple sources.

The configuration of the system in its novel re-purposing of conventional routers may support fault tolerance and scale through the addition of hardware at the concentration layer in redundant fault tolerance nature of the hardware systems that may be employed in the routers. For example, a dual parallel broadcast fabric backbone 1220 may provide fault tolerance and scale by additional broadcast backbones adding redundancy in the broadcast path and may allow the system to scale and handle a massive data load as data is concentrated onto the broadcast point-to-multipoint hardware devices to make streaming bid/ask information available for classification and distribution in a taxonomy of bid/ask information.

The topic selection 1242 layer may use router tables to selectively broadcast bid/ask information into a taxonomic broadcast. Here, router tables may be used to selectively mask bid/ask information into a taxonomy broadcast of category, topic, sub-topic and microtopical information and further into geographical and other encoded filtering formats.

Figure 12A:
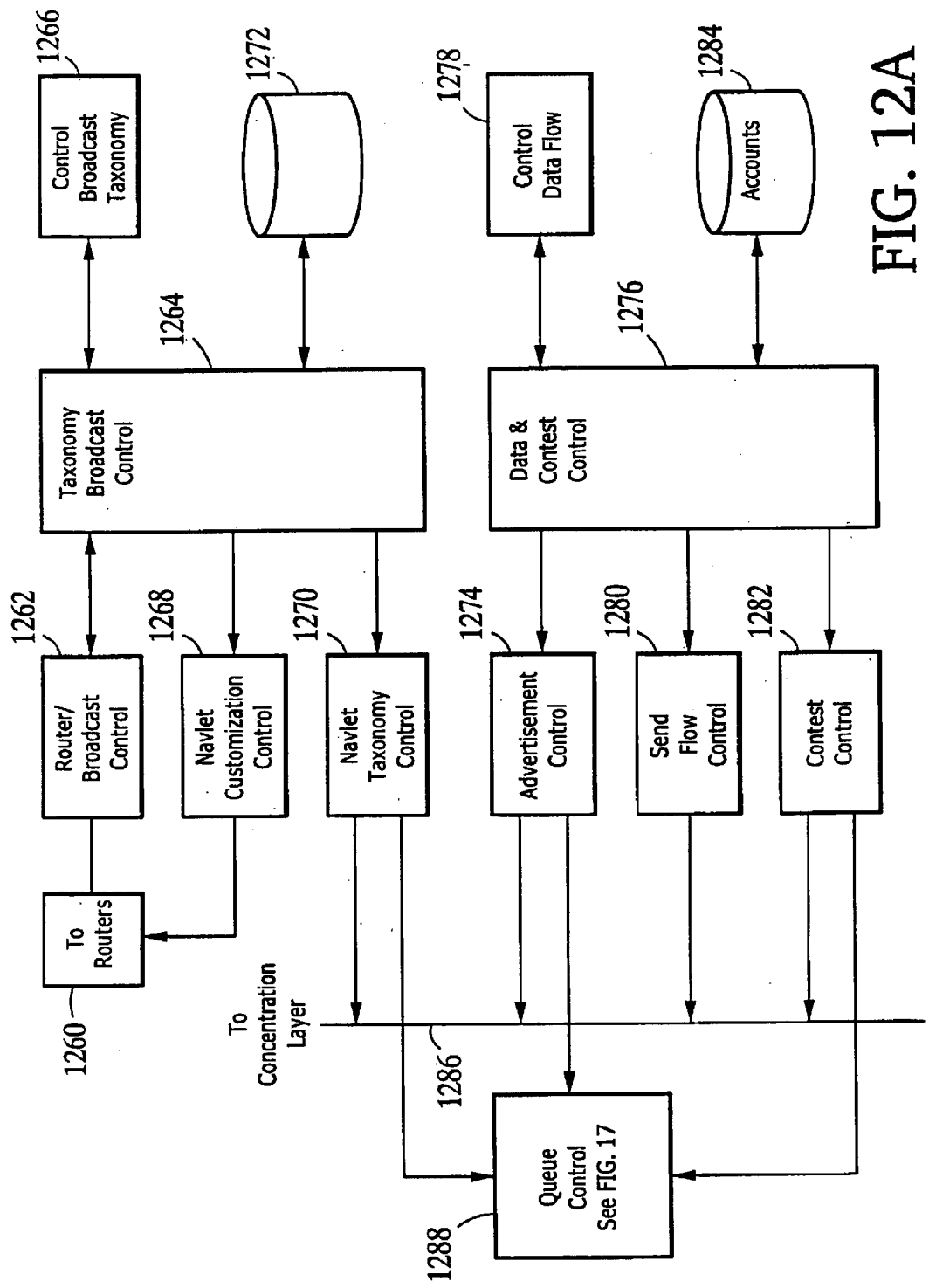
FIG. 12A may depict a functional block diagram of a control program that may be employed by the system.

A control program, see FIG. 12A, may be used to program and control the appropriate router tables to mask data into a taxonomy broadcast. Here, for example, a mask or table router entry of 255.200.1.xx.xxx may represent retail.consumer_electronics, which may provide an output of bid/ask information in the retail.consumer_electronics category. As a further illustrative example a mask entry of 255.3xx.xxx.xxx may represent retail.appliances. A mask entry of 255.33x.xxx.xxx may represent a mask entry of retail.applicances.stove. A mask entry of 255.333.xxx.xxx may represent a mask entry of retail.applicance.stove.gas. A mask entry of 255.333.3xx.xxx may represent a mask entry of retail.appliances.stoves.gas.Viking. Thus, the 255.333.3xx.xxx table entry may provide streaming bid/ask information on Viking brand gas stoves. A further mask entry in the source or destination data field of the SNAP or functionally equivalent frame may further mask bid/ask information as, for example, Viking brand gas stoves in the 22xxx zip code geographic area where zip code information may be translated into the proper hexadecimal, octal or other address encoding scheme as supported by the IP addressing format masked by conventional routers. Thus, the programming and updating of mask or router table entries in the topic selection 1242 in the conventional routers 1208, 1222 and 1236 may provide for different levels of taxonomical geographical information for broadcast from the concentration layer 1220. Many different taxonomic or categorization schemes are supported by the system's novel dual use of IP packet header fields and the examples given herein are merely illustrative. The category, topic, sub-topic and microtopic selective section 1242 may pass taxonomized streaming bid/ask information to a broadcast stage 1244. As previously discussed and incorporated herein by reference the broadcast stage may support a plurality of interfaces to provide cross-platform connection to the end user applications and navlets. Here, for example, the IP RSVP and RTP protocols may be used to connect a plurality of navlets to the IP broadcast through conventional RSVP/RTP tree structures and control methods across a network of routers that support RTP/RSVP. The client selection stage 1248 may use a navlet that supports the client side of the RTP/RSVP IP protocol to connect to an IP broadcast session provided by the IP broadcast stage 1244. In one mode of the system, IP broadcast and/or RTP/RSVP support may be included in the conventional router that is utilized at the topic selection stage 1242. In this instance, user monitoring and IP broadcast session control may be managed, tracked and monitored through conventional router management and tracking packages available with commercially available routers. Another mode of the system may require a user to provide login or profile information at a web page before allowing the user access to the streaming bid/ask information. As described above, a navlet may appear as a single instance or multiple instances at a web page and the navlet may be a modular Java program that may be downloaded and executed by a browser 1212. Here, each navlet may subscribe or connect to the taxonomic streaming bid/ask informational "channel" to perform useful functions such as displaying streaming bid/ask information in a hierarchy, analyzing streaming bid/ask information and providing a way to logically navigate streaming bid/ask information. Another instance of the navlet may provide a navlet in an "un-docked" or stand-alone mode. Here, the navlet may provide the useful function of displaying streaming bid/ask information by subscribing to the IP broadcast of taxomic bid/ask information 1244, providing a way to analyze streaming bid/ask information and a way to navigate and search streaming bid/ask information. A client filter stage 1250 may be used to filter and or provide alarm functionality to the end user or navlet instance 1214 and 1228.

Thus, one way to further understand the system is by demonstrating the end-to-end flow of streaming bid/ask information. The streaming bid/ask information may begin at a dynamic or static pricing, transactional or non-transactional systems 1202, 1216, and 1232. The send program functionality may be used to place information about the bid/ask subject into an application layer frame, which may be used by a concentration layer/selection stage 1220 and 1242 to concentrate information from a plurality of sources and provide a way to output bid/ask information based on a pre-determined taxonomy. Bid/ask information from the send application functionality thus may or may not be encapsulated for transport to the concentration layer and the bid/ask information may be repeatably selected, depending on the depth of the predetermined taxonomy, and router mask table programming, for point to multipoint transmission at the IP broadcast stage 1244. A navlet may connect or subscribe to an IP broadcast session and receive the bid/ask information in a stream of bid/ask information at the client selection stage 1248. Here, the client application may further filter the bid/ask information, based on the information encoded in the application layer frame, to capture or display bid/ask information of particular interest to the subscriber. The client may "click" on an instance of the streaming bid/ask information which may provide a URL for which a user application may locate through the internet world wide web 1252 a data record in a dynamic pricing system that was or is the subject of the instance of streaming bid/ask information 1254. In one mode of the system, the URL to the record of the subject of the instance of the streaming bid/ask information is the payload of the SNAP frame. Here, the information for the URL may include a short display name, a URL address and parameters sufficient to access the database to invoke the generation or display of the bid/ask subject of the SNAP frame. The URL request 1230 may pass through a packet network such as the Internet 1252 to access the dynamic content with a URL string 1254 sufficient to access the appropriate content. The dynamic pricing application 1232 may respond with a web page that displays the high bid or ask price 1258. The user, now at the interface provided by the dynamic pricing system may respond with a bid 1256 to which the dynamic pricing system may accept 1254.

FIG. 12A may depict a functional block diagram of a control system as used by the taxonomic broadcast mode and the message queuing mode of the system. A taxonomic broadcast control module 1264 may be used to control the router mask tables 1262 and for navlet customization control 1268. Here, for example, the router broadcast control may be used to create masking tables in conventional routers sufficient to provide a useful taxonomic broadcast of SNAP-based bid/ask information. The navlet customization control may provide a unique mask table entry specific to a particular navlet, which may be coordinated with the broadcast control 1262 to establish a unique channel for a particular navlet. The navlet taxonomy control 1270 may be used to format XML tagged based messages to navlets to place the navlet into a dynamic taxonomy. Here, for example, if the system add topic level channels, for example, distinguishing between Caribbean, Alaskan and Greek island cruise vacations, the system may dynamically program its taxonomy as: create a new mask table entry for cruises that distinguishes between Caribbean, Alaskan and Greek island cruises; establish IP broadcast addresses for the additional taxonomy, distribute by placing XML based control data onto the concentration layer fabric that the navlet monitoring the cruise taxonomy should be programmed to navigate down to a predetermined IP address that display navlets receiving the Caribbean, Alaskan and Greek cruise broadcast and that navlets receiving the Caribbean, Alaskan and Greek island taxonomy of streaming bid/ask information should navigate up to a web site that displays the cruise taxonomy. The taxonomy control module may broadcast the taxonomy in use by the system on a predetermined IP channel to inform navlets and other applications about the organization of the taxonomic broadcast.

The system may insert advertisements for display at navlets based on the taxonomy broadcast or through message queues. Here, for example, an advertisement designated as corresponding to art, such as an advertisement for a scheduled auction may be injected into the concentration layer backbone by creating a SNAP frame that contains the appropriate header taxonomy information and a payload that contains a URL that points to the desired advertising. The data and contest control module may collect account information on the distribution of advertising.

The advertisement control module 1274 may also distribute advertisements by creating a message for use in a channel queue, described further below, and inserting the advertisements into the channel queue. Here, advertisement insertion in the message queue 1288 may also be encoded with a time to live (TTL) or predetermined termination time as used by other messages in the queue to provide a time-limited display of the advertisement at the navlet.

The system may employ communication between the concentration layer 1286 and the respective send modules to provide flow control 1280 to the respective send modules. In this mode of the system the send control module 1280 may use conventional IP flow control techniques to provide flow control instructions to the respective send modules.

The system may employ a contest control module 1282 to distribute pictogram or glyphs to navlets to encourage participation in contest designed to reduce navlet breakage. In the SNAP mode, the system may encapsulate a contest glyph or a URL that points to a contest glyph in the payload of the SNAP frame. In the message queue mode, the system may place the contest glyph into an appropriately formatted channel message for display at navlet(s). Here again the system may encode the contest glyph with a time to live parameter to limit the display of the contest glyph.

Another mode of the system may generate a navigational taxonomy, support participant-designated bid/ask information and function in an environment where a navlet may pull information from a server.

Figure 13A:
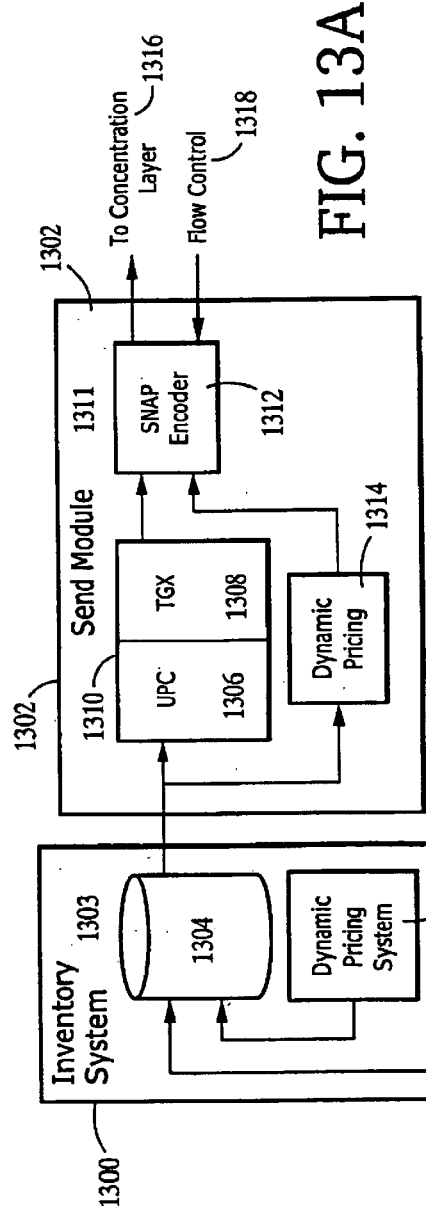
FIGS. 13A, B, and C may depict methods that may be employed by the system to collect information and transport dynamic pricing information.

FIGS. 13A, B and C may depict functional block diagrams of the send modules that the system may employ to collect dynamic pricing information.

FIG. 13A may depict a send module that works in conjunction with UPC data collection systems 1322, inventory systems 1320 and dynamic pricing systems 1320 to encode data into a SNAP application layer frame to collect and transport dynamic pricing information to the system. The UPC data collection system 1322 may be a conventional UPC-based inventory control system as may be employed to track and encode information about goods and inventory. The UPC collection system may be conventionally integrated into an inventory system database 1304. Here, the UPC and inventory system may execute in conjunction with a dynamic pricing system or provide an interface to receive dynamic pricing information from an external system 1320. The send module 1311 may contain a table to map UPC codes 1306 to a taxonomy encoding scheme 1308 as may be employed by the system. Instances of dynamic pricing may be pulled or pushed from the system 1303 with its UPC encoding to identify the item subject to dynamic pricing. Facts about the dynamic pricing instance may also be pulled or pushed from the system 1303. The UPC encoding may be mapped by the send module 1311 by the UPC/taxonomy mapping table 1306/1308 and combined with dynamic pricing information 1314 for input into a SNAP encoder 1312. The SNAP encoder may output appropriately formed SNAP packets containing a short name (which also may be determined and controlled by either the inventory system 1303 or the UPC/taxonomy mapping table 1310), dynamic pricing information and a URL to point to the source of the dynamic pricing information 1320 for transport to the system's concentration layer 1316. The send module 1311 may receive flow control 1312 and table programming information from the concentration layer and the system taxonomy control module to program and control data flow from the send module 1311.

Figure 13B:
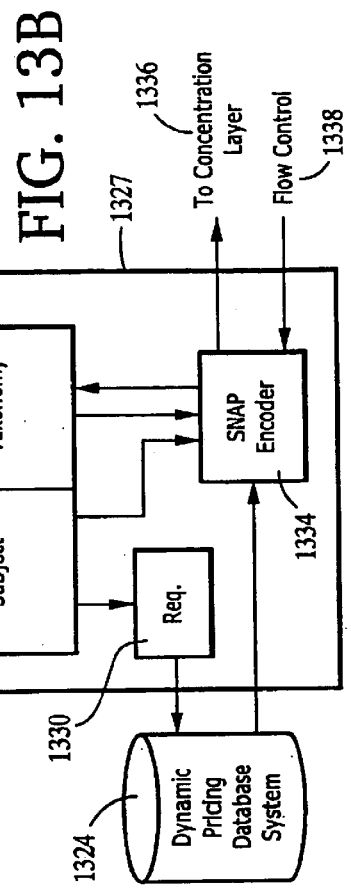

FIG. 13B may depict a send module that may be used by the system to extract dynamic pricing information from non-integrated dynamic pricing systems 1324. Here, the send module 1327 may use predetermined subject matter based inquiries to form search requests 1330 for input into a dynamic pricing system 1324. The subject matter search request may work in conjunction with taxonomy encoding information 1328 to create subject matter search requests that correspond to taxonomy information employed by the system. The dynamic pricing system may return information which may be parsed, as described herein and incorporated by reference, to extract facts about the dynamic pricing information. The SNAP encoder may receive a short name for the dynamic pricing information. The SNAP encoder may receive a short name for the dynamic pricing instance from the subject matter search module 1326, taxonomy information that corresponds to the subject matter search and facts about the dynamic pricing instance to encode SNAP messages for transport to the concentration layer 1336. The SNAP encoder may receive flow control and subject matter/taxonomy information from the concentration layer and the taxonomy control program to control the data flow from the send module 1327.

Figure 13C:
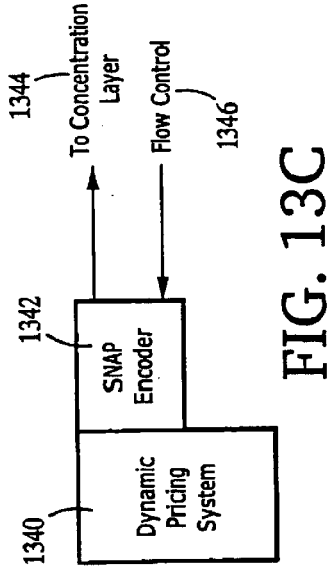

FIG. 13C may depict a send module in dynamic pricing system that is tightly coupled to the SNAP encoder. Here, the dynamic pricing system may maintain a short name, taxonomy information and dynamic pricing information for input into the SNAP encoder. The SNAP encoder may assemble and output the SNAP application layer frame for transport to the concentration layer 1344. The SNAP encoder may receive flow control information 1346 from the concentration layer to control the data flow into the system.

Figure 14:
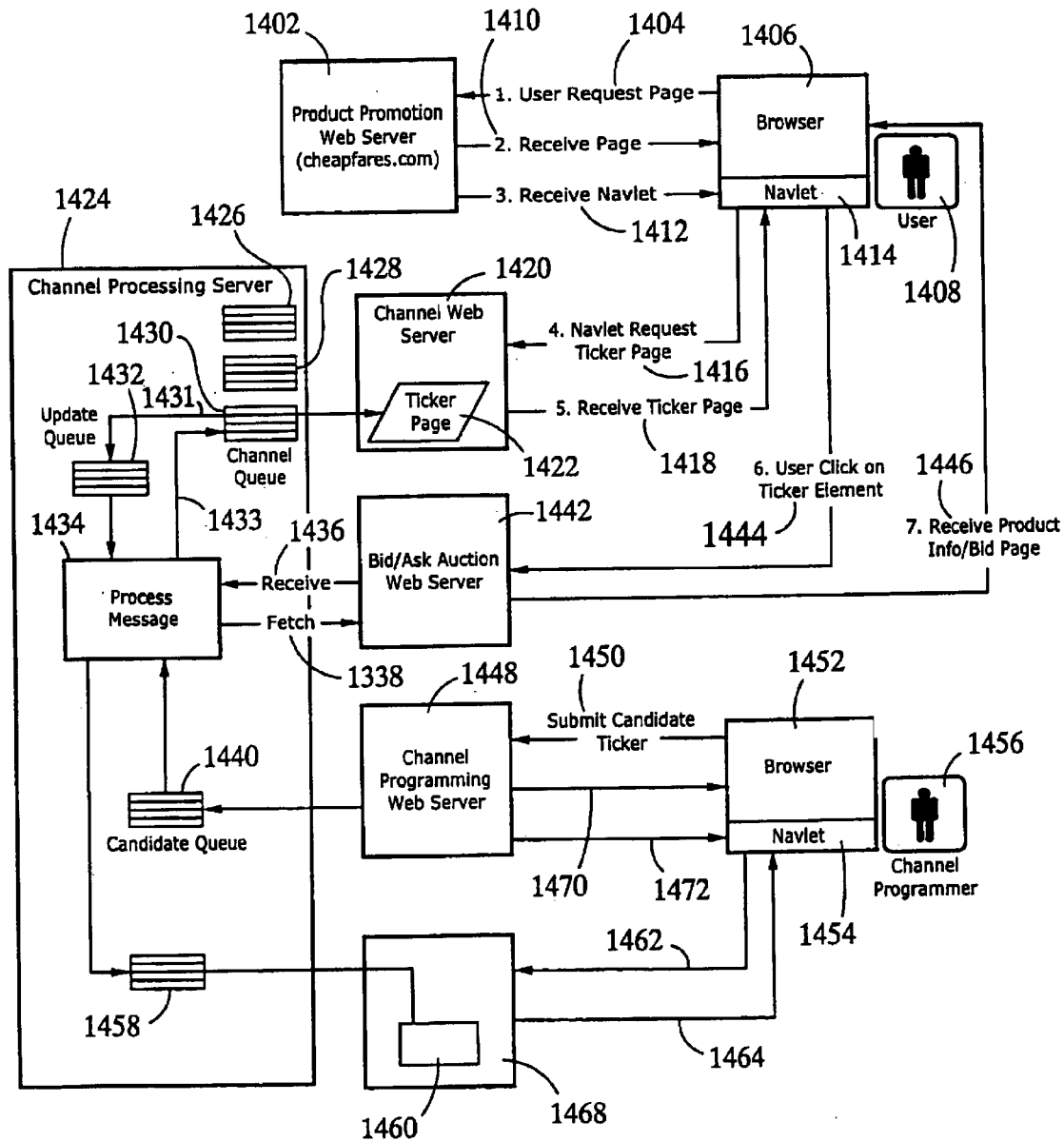
FIG. 14 may depict a high-level functional diagram and implementation of the concentration and channelization layers in a message queuing embodiment of the system.

FIG. 14 may depict a high level block diagram view of another mode of the system. In this mode, a browser 1406 may request one or more pages 1404 from a web server 1402 within a taxonomy or as a standalone instance of a navlet 1402 whereby the server 1402 may respond to the page request by providing information 1410 and a download of a navlet 1412. The navlet 1414 may issue a request for a page of dynamic pricing information 1416 from a server 1420 configured to support the navlet 1414. The server 1420 that supports the navlet 1414 may provide information about dynamic pricing information, advertisements or coupons in response 1418 to the navlet request 1416. The navlet 1414 may display the information received in response to its request for information 1418. The response to the navlet 1418 may contain information encoded with XML tags to govern the further operation of the navlet such as request recurrence frequency and taxonomic information to place the navlet into a taxonomy. The navlet 1414 may request a page again 1416 to which it may receive a response with new data or control information 1418 thereby establishing an update loop between the navlet 1416 and the navlet support server 1420. The system may support a navlet load factor by providing XML tagged control information to slow or speed up navlet requests 1416.

The navlet support server 1420 may be supported by a processing server 1424 that may provide information about the dynamic pricing data and distribute advertising and coupons and support a loyalty program, as discussed further below and incorporated herein by reference. The processing server 1424 may support a plurality of "channels" which may corresponded to a taxonomic organization of data or to user-profiled pages as discussed further below in queues 1426, 1428 and 1430. Reference to dynamic pricing information may, for example, be popped off a channel queue 1431 and placed into an update queue 1432. The processing server may process information from the update queue 1432 to generate a request to fetch 1338 information about the dynamic pricing instance from, for example, an auction system 1442 and retrieve the information 1436 in response to the fetch request 1338. The process message function may parse the response 1436 to extract facts, such as the current bid and whether and when the auction has terminated or is scheduled to terminate to update the channel queue 1430 with current information about the dynamic pricing instance 1433. Thus, the process server may establish an update loop between the channel queue 1426, 1428 and 1430 and the update queue 1432 and the process message function 1434 to continuously update the dynamic information for display at the navlet(s) 1414. In one mode of the system the update queues process message 1434 channel loop may eliminate redundancies in the update queue, thereby unburdening the bid/ask server 1442 of multiple requests for the same information and may further provide a queue method and control through providing information that prioritizes information in the channel queue and update queue and by controlling navlet update frequency through the distribution of frequency information through XML tags to increase the frequency of dynamic pricing data updates, for example, as an auction nears its predetermined termination point.

As previously described, herein incorporated by reference, the instance of dynamic pricing information may contain a short name such as "Sony RX-200 $300" and information about the location of the source of origin of the dynamic pricing information such as a URL for display at the navlet 1414. Here, the user 1408 may select the dynamic pricing instance on the navlet 1414 to provide a way to rapidly link to the source of origin of the dynamic pricing information 1444 to which the user 1408 may receive a response 1446 from the source of origin of the dynamic pricing information 1442 in a URL response 1446.

A taxonomic hierarchy of dynamic pricing information may be provided by a channel programmer 1456 to provide information to populate into pages that contain multiple navlets, navigational web pages or a single navlet instance at, for example, the brand or source of origin of goods level. Here, the channel programmer 1456 may submit candidate information, which may be in the form of a URL to a channel programming web server 1448. The channel programming web server 1448 may present a browser 1452 with a web page of data fields for the channel programmer 1456 to "drop" or input candidate URLs. The candidate URLs may be placed into a candidate queue at the processing server 1424 to provide an input stream to the process manager. Multiple instances of candidate queues and processes may exist to support the multiple instances of predetermined navigational or support channels 1426, 1428 and 1430 whereby the process message process may pop a URL from a candidate queue, verify that the URL for the dynamic data can be fetched 1338 and received 1436 to appropriately place the dynamic data instance into the respective channel queue.

In another mode of the system, the channel programmer 1456 may be replaced by a user so that the user may generate a user-specified instance of pricing data. Here, a user 1456 may use a browser 1452 to access a web page from a server 1448 to establish a user "channel" by receiving a web page 1470 that provides data fields for the user to program a short name for the dynamic pricing instance and a URL address of where the dynamic pricing instance is located. The user may also receive a navlet 1472 that points to a web server that services requests from the navlet as described above and incorporated herein, to establish the loop between the navlet 1454 and the server 1460 to receive 1462 and service 1464 information request from the server 1468. Here, the user-designated instances of dynamic pricing data may be submitted to the candidate queue 1440 which may in turn be serviced by the process message process 1434 to parse and retrieve dynamic pricing data as described above. Here, the dynamic pricing data may be placed into the queue 1458 to generate and establish an update loop as described above to service the user-designated instance of dynamic pricing and to receive the user-designated dynamic pricing at the navlet 1454.

Figure 15:
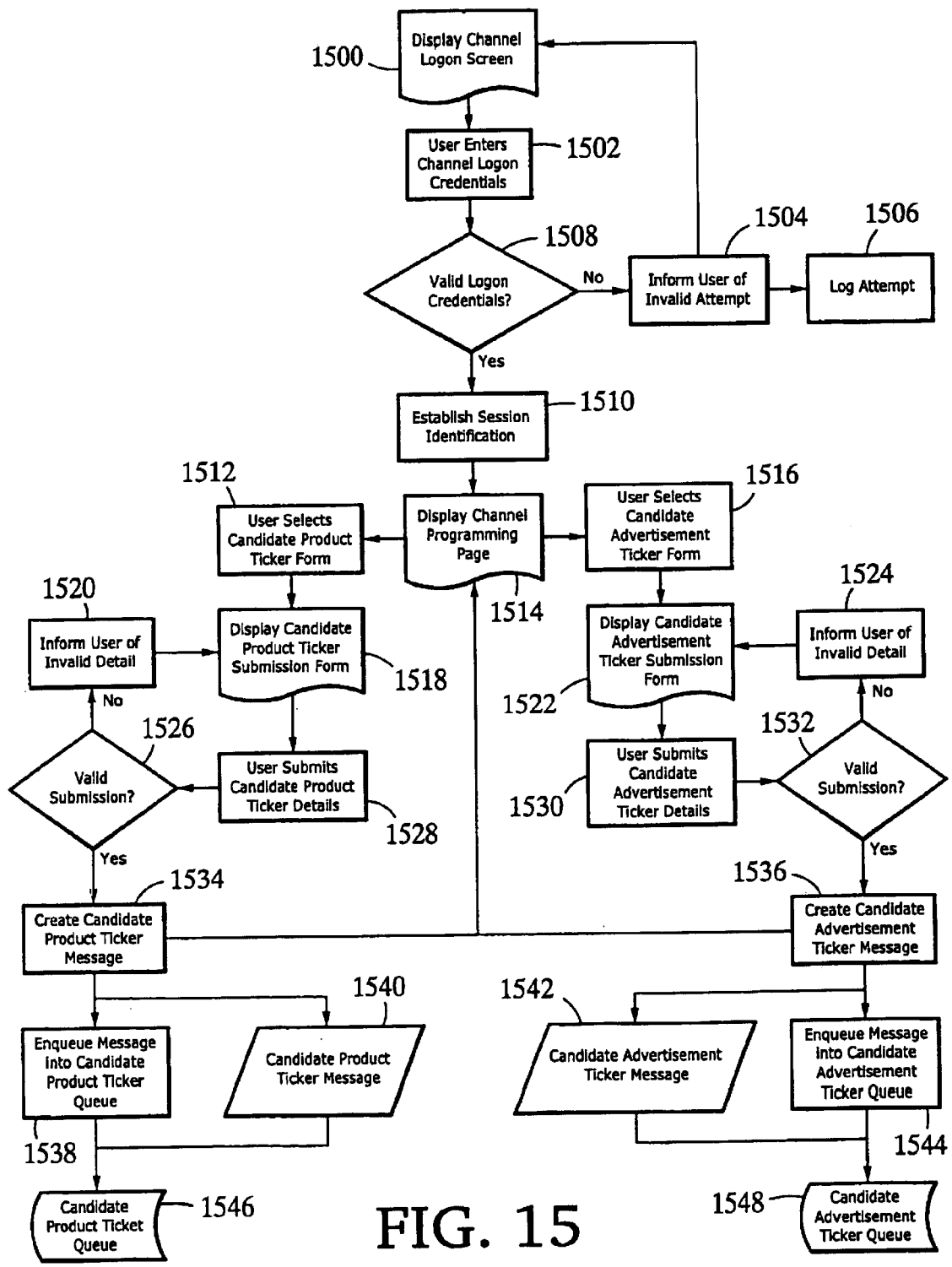
FIG. 15 may depict a control program that may be employed by the system to create user-defined and system-defined channels of information that may be used by the navlet and other applications.

FIG. 15 may depict the user interaction with the web site for a candidate item submission to the navlet server. The system may provide a logon screen 1500 to collect user profile and account information for use with the system. The system may also provide the logon screen 1500 as a way for the system to identify a user logon name or account with a user designated channel of data by providing a relationship between a user logon identification and a URL for a user navlet server page by conventional database entry and tracking techniques. The system may provide a web screen for a user to provide logon credentials 1502 which the system may verify as valid 1508 or reject and inform the user or the system of the invalid logon attempt 1504 and record the attempt 1506 which may be used to evaluate whether to terminate additional logon attempts from a particular IP address. The system may establish a session with the user after a valid logon 1510. The system may then provide a channel or navlet programming page 1514 for data entry or interaction with the user. The user may select a form to provide submission of a URL that points to an instance of dynamic price information 1512 which may display a candidate product submission form 1518. The user may then submit the candidate of dynamic pricing information to the system 1528. The submission may require a short name for display at the navlet of the dynamic pricing instance. The system may then determine whether the information points to or contains enough information to form a sufficient request 1526. If the submission is sufficient the system may accept the submission to create a candidate message for the dynamic pricing instance 1534. If the submission is not sufficient the system may inform the user of the insufficiencies 1520 and return the user to the display candidate form 1518. The system may then return the user to the display programming page 1514 to elicit further submissions from the user. The system may process the candidate instance of dynamic pricing information by forming the information for entry into a candidate dynamic instance queue 1539 and the system may further generate a message 1540 that the dynamic pricing instance has been placed into the candidate product dynamic instance queue 1546. At this juncture, the system may have collected further information about the dynamic instance, such as the termination date and the time of the auction or the expiration date of an offer for submission of expiration information into the candidate queue 1546. The system may accomplish this data collection function by requiring the information from the user during the submission process or through the invocation of a parsing program at 1540 to collect the expiration or termination information from the source of the dynamic pricing instance. The system may use the expiration or termination information as a data field in the candidate queue 1546, which may be subsequently used by the system for queuing priority and navlet frequency adjustment. Here, for example, the system may use the termination date and time for an instance of dynamic pricing at an auction to increase the refresh rate of the system as the auction nears its termination.

In another mode, the system may display a candidate advertisement form to the system 1516 to a predetermined administrative user of the system or to general user as a way to collect user profile information and as a way for users to place advertisements, distribute coupons or propagate game pieces. User profile information may include what types of advertisements or electronic coupons and contests the user has an interest in participating. Here, the system may allow a user to enter contests as further described below. In the advertisement mode of the system an administrative or other user may submit a URL that points to an advertisement 1516 which may be submitted at a URL submission form 1522. The system may verify that the submission is sufficient for such details as advertising account and billing information through the verification loop 1532 and 1524. In another mode of the system, the advertisement submission task may point to a URL for advertisement insertion by a third party server such as doubleclick™ in which case the submission dialog may be replaced with a procedure which specifies parameters to pass to third party servers. The URL which points to the advertisement may be placed into a queuing format for use by the system 1576 which may in turn place the appropriately formatted reference to the advertisement into the appropriate system queue 1544 for queuing 1548 for subsequent propagation to the appropriate navlet(s). The system may also generate a message to indicate the placement of the reference to the advertisement for system accounting and performance tracking 1542.

Figure 16:
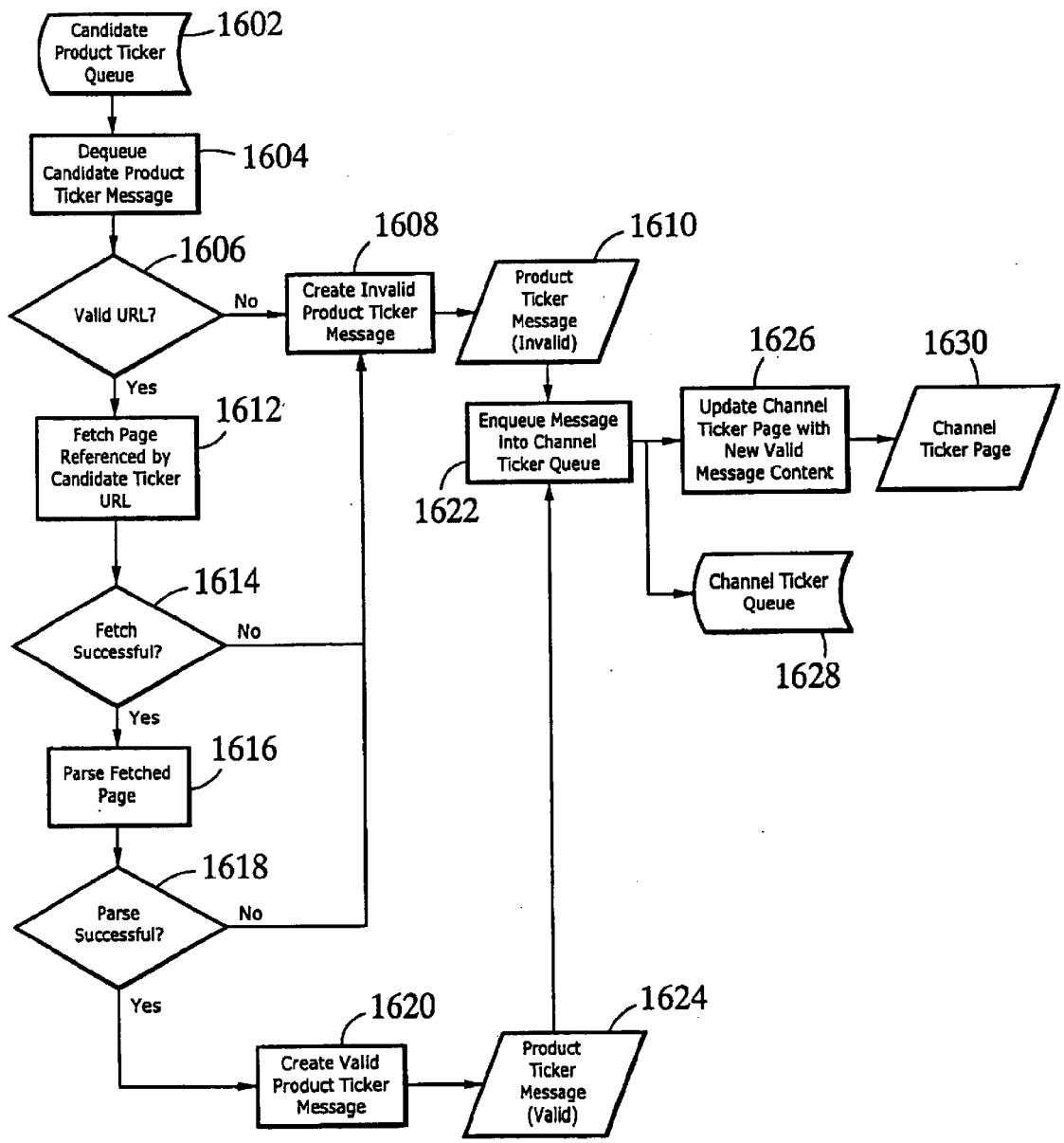
FIG. 16 may depict a functional block diagram of a way the system may process information abut the location of a dynamic pricing instance to convert the information for use by a navlet and other applications.

FIG. 16 may depict a flow diagram for processing messages from a candidate queue to a channel queue. Here, the candidate dynamic pricing instance 1602 may be removed from the queue 1604 for processing. The system may check to determine whether the URL pointing to the dynamic pricing instance is a valid URL that points to valid data 1606. If the URL is valid the system may fetch a web page that contains the dynamic data instance 1612 and determine whether the fetch was successful 1614. In another mode of the system the fetch procedure 1612 may be replaced by an application program interface (API) with the database that contains the instance of dynamic pricing information by, for example, collecting information from the user, such as a unique item identification, that may be used to access the database through an API. If the fetch was successful 1614 the system may parse the fetched pages 1616 to extract facts about the instance of dynamic pricing. If the parse is successful 1618 as verified by conventional parsing techniques such as range checking the values assigned to data fields, then the message may contain valid facts about the dynamic pricing instance.

Figure 17:
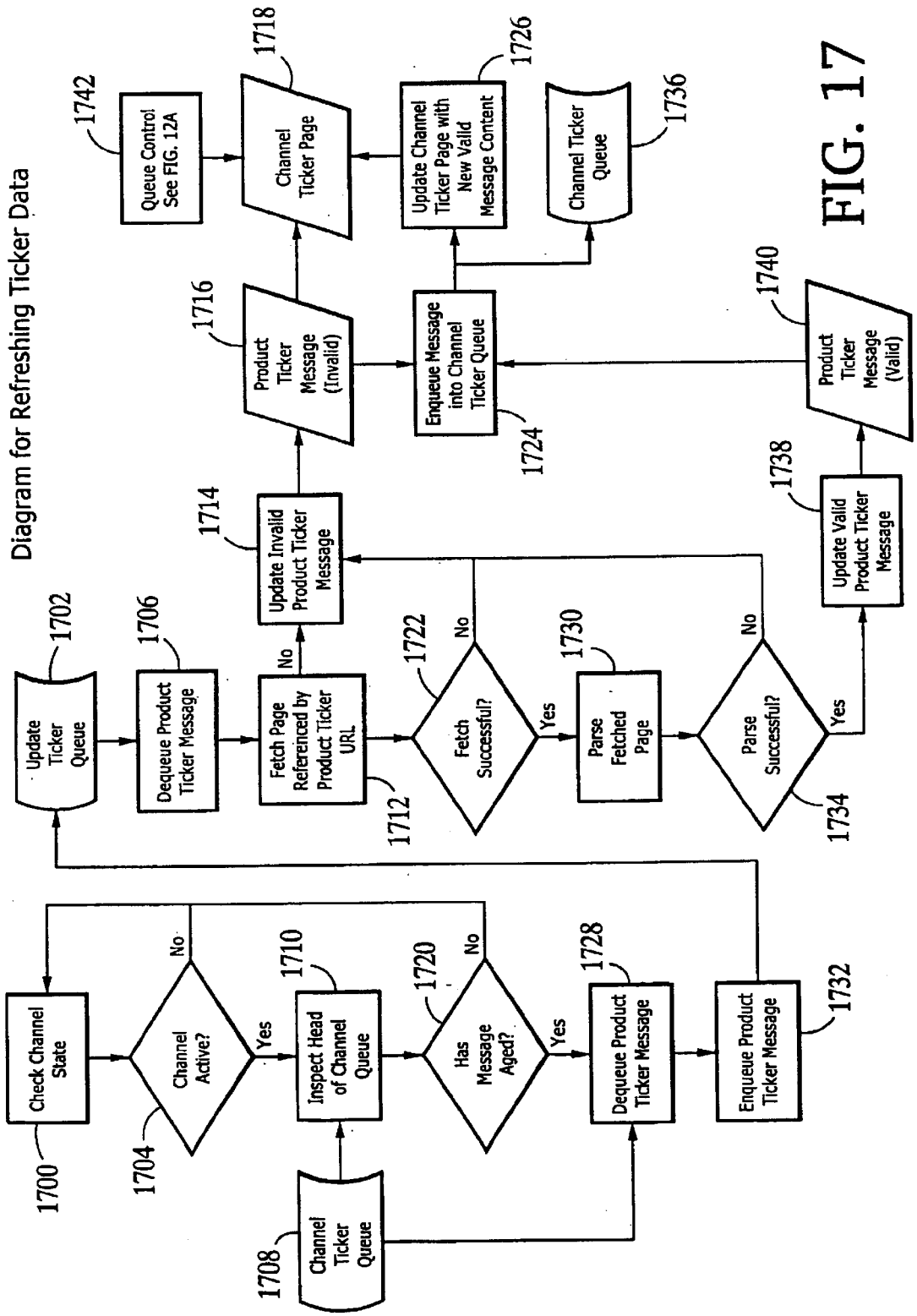
FIG. 17 may depict a functional block diagram of a way the system may employ messaging and inter-process communication to update the data displayed at a navlet and other applications.

FIG. 17 may depict a block diagram of a data flow that may be used to communicate with a navlet. The system may check a channel state 1700 to determine whether the channel is active, e.g., whether a navlet or other application is in communication with the channel. In one mode of the system the channel activity may be determined by calculating the difference between the times the channel or web page was accessed by an external source, such as a navlet. After a predetermined period of time in which the channel has not been accessed it may be declared inactive and dropped from the update loop. If the channel is active 1704 the system may inspect or pop a record from the channel queue 1710. The system may then determine whether the record has aged sufficiently to determine whether the message requires an update. Here, a data field in the data record in the queue may be used to determine the termination period for the dynamic pricing instance. If the dynamic pricing instance is nearing its termination point the system may use this information to determine 1720 the age of the record and whether the system should update the record. If the record has aged the system may pop the message from a channel queue 1728 and queue the message 1732 to schedule the update of the dynamic pricing instance 1702. The system may pop the update message 1706 from the update message queue 1702 and fetch the page specified by the update message 1712. If the fetch is successful the system may parse the page to extract facts about the dynamic pricing instance 1730. If the parse is successful 1734 the system may use the extracted facts about the dynamic pricing instance to construct a product message 1738. The system may then verify that the dynamic pricing instance message is properly formatted and data range check the data before propagation to a channel queue 1740. The valid message may then be pushed onto a channel queue 1724 to update the channel page with a new valid message 1726 and 1718. The system may also push the message onto the channel queue 1736 in a modified FIFO configuration to place the message of the dynamic pricing instance into an update loop, see 1736 and 1708. (The FIFO may be modified to place terminating dynamic pricing instances higher in the queue to speed the system's update of the dynamic pricing instance as it nears its predetermined termination point). If the fetch was not successful 1722 the system may declare the dynamic pricing instance invalid 1714, which the system may use to kill the message pointer to the dynamic pricing instance 1716. If the parse of the page of information containing the dynamic pricing instance was not successful 1734 the system may declare the dynamic pricing instance invalid 1716 and kill the system message pointing to the dynamic pricing instance 1716.

The system may use a queue control or channel control program, as described above and incorporated herein by reference, to control the distribution of advertisements and contest tokens in each particular channel 1742. The system may support multiple instances and queue used and supported by the system in FIG. 17 to support multiple navlets and channels.

Figure 18:
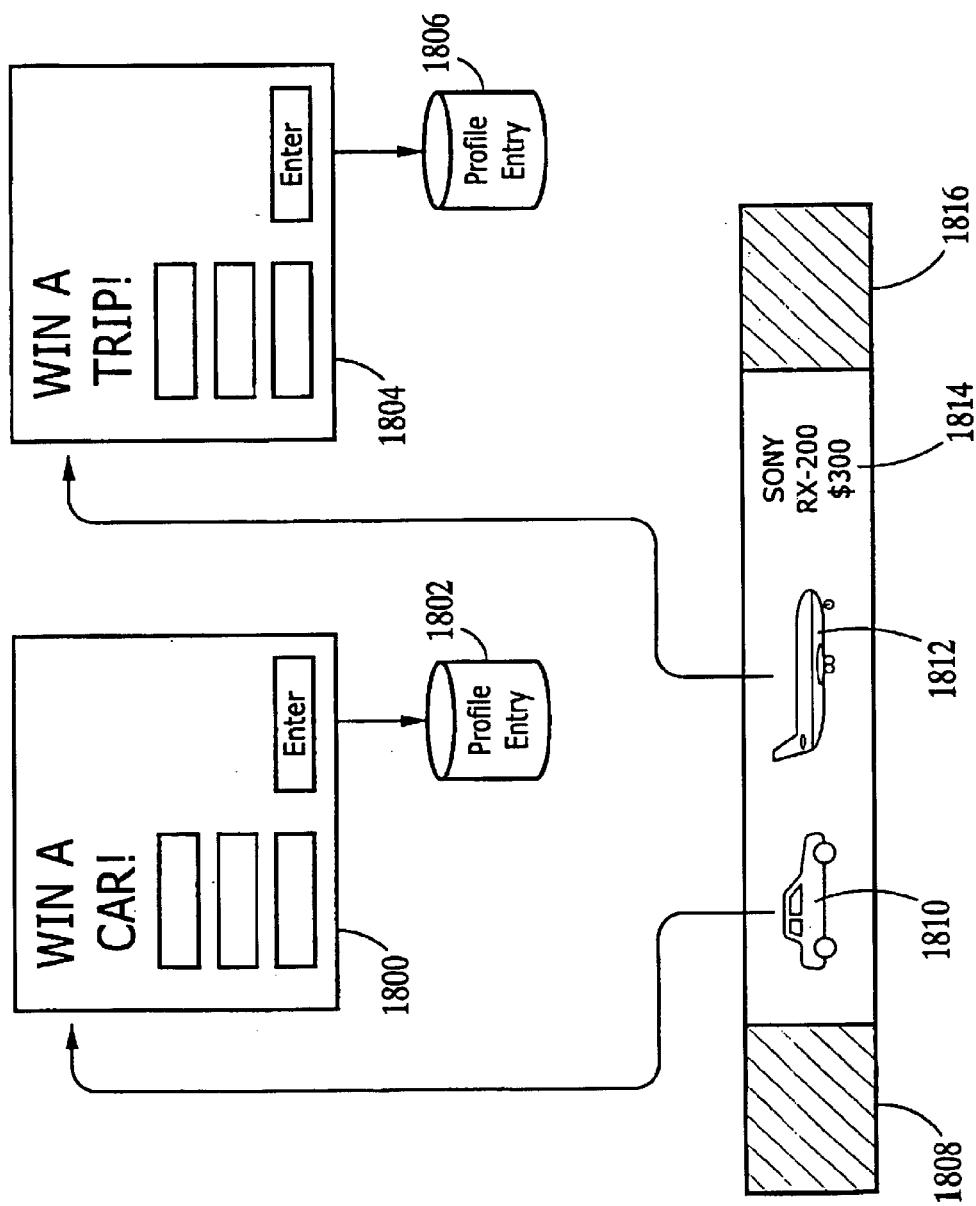
FIG. 18 may depict a diagram of a loyalty and contest program that may be employed by the system.

FIG. 18 may depict one of the many contests that the system may employ to reduce navlet breakage, e.g., to encourage continued participation in the navlet based system. A navlet 1816 may display pictograms or glyphs of objects to encourage interactive participation with the navlet based system. The navlet, here for example, depicts a glyph of a car 1810 and a plane 1812. The glyphs may provide an interactive link to a web page or system that is executing a loyalty program such as a contest to win a car 1800 or a vacation package 1804. Here the system may require that a user provide user profile information, which may be collected with a contest entry 1822 and 1806. In one mode of the system, the system may use information as to how long the navlet has been in operation to control the distribution of contest tokens, e.g., to reward sustained viewership. In another mode of the system, the system may use taxonomic information to distribute targeted contests such as a vacation to Napa Valley, California to a navlet connected to a wine or cuisine taxonomy.

Figure 19:
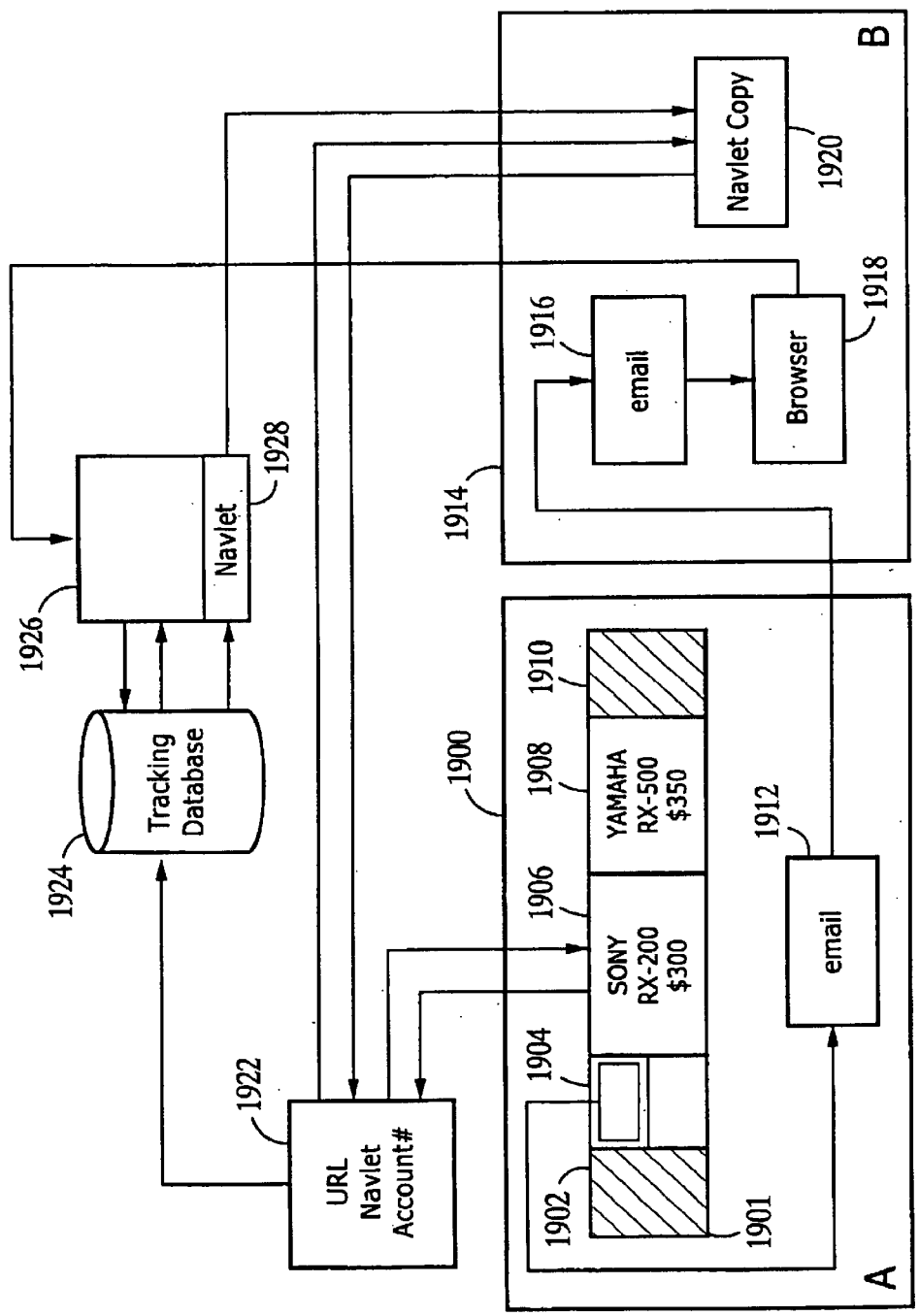
FIG. 19 may depict a way the system may allow the transfer of a navlet to another location or computer or from one user to another.

FIG. 19 may depict a functional flow diagram of a way the system may support the e-mail transfer of navlets between different locations and users. Here, for example, the navlet 1910 and a first participant or location 1900 may contain a control 1904 to e-mail the navlet 1901. The e-mail control 1904 may pass an argument that contains information sufficient to identify the page at which the navlet is receiving information 1922 or from which IP broadcast or multicast IP address the navlet is receiving information. The passed information may be used as text information for an e-mail program 1912 designated by user 1900 through browser preference controls. The user may then include additional text to the e-mail and designate an e-mail address to send the navlet. The user may then send the e-mail to another location or to another user B 194. The user B may receive and open the e-mail 1916 and select the URL passed by argument from the navlet 1901. The URL may invoke a browser 1918 at user B to pass a URL containing arguments to a tracking database 1924. The tracking database may respond with a navlet 1920 that receives an argument to pull information or "tune," e.g., enter a session with, the taxonomic broadcast 1922 that was the data source for the navlet 1901 at a new instance of the navlet 1902.

These and other permutations and uses for the system are readily apparent to one skilled in the art upon use and disclosure of the described system. Therefore we claim:

What is claimed is:

1. A method for providing an interactive linkage between a search engine and dynamic pricing content available on a computer network, the method comprising:

receiving dynamic pricing information representing items available on the computer network, the items having a predetermined taxonomy classification encoded in a header for each item;

concentrating said encoded dynamic pricing information onto a concentration layer, said concentration layer having more than one output, at least one output having a selection based on the predetermined taxonomy classification for selecting dynamic pricing information from a category in the predetermined taxonomy, the category having at least one sub-category in the taxonomy classification schema;

organizing links to the received dynamic pricing information into a predetermined taxonomy; and providing to the search engine a mapping between search requests and the predetermined taxonomy, the mapping comprising reference pointers to dynamic pricing content that can be returned in response to search requests at the search engine.

2. The method of claim 1 further comprising returning, in response to a search request at the search engine, a reference pointer comprising an interactive link to dynamic pricing information corresponding to the search request.

3. The method of claim 2 wherein the interactive link comprises one or more Uniform Resource Locator (URL) addresses.

4. The method of claim 2 wherein the interactive link comprises one or more meta-tags.

5. The method of claim 1 wherein the reference pointers are indexable.

6. The method of claim 1 wherein the reference pointers comprise indices into a database of dynamic pricing information.

7. The method of claim 1 wherein dynamic pricing information comprises bid/ask pricing information for goods/services available in commerce.

8. The method of claim 1 wherein the predetermined taxonomy comprises a classification hierarchy.

9. The method of claim 8 wherein the classification hierarchy corresponds to goods/services available in commerce.

10. The method of claim 8 wherein the classification hierarchy includes a plurality of levels including a category level, a topic level and a sub-topic level.

11. The method of claim 10 wherein a highest level of the classification hierarchy describes goods/services at a highest level of generality and each subsequent level in the classification hierarchy describes goods/services at increasingly detailed levels of generality.

12. The method of claim 1 wherein organizing links to dynamic pricing information comprises generating data packets having encoded headers, each encoded header describing a payload of the data packet.

13. The method of claim 1 wherein the reference pointers comprise a stream of dynamic pricing information that has been collected from the Internet.

14. The method of claim 13 wherein the stream of dynamic pricing information is organized and/or filtered according to predetermined criteria.

15. The method of claim 1 wherein the available items comprise goods or services or a combination of goods and services.

16. A dynamic pricing system comprising:

one or more sources of dynamic pricing information representing items available on a computer network, the items having a predetermined taxonomy classification encoded in a header for each item;

a dynamic taxonomy, having a plurality of levels of detail for describing available items, for classifying the dynamic pricing information;

a mapping between the dynamic taxonomy and a fixed taxonomy employed by a search engine, wherein the mapping is applied to a starch request at the search engine to return a pointer to dynamic pricing information corresponding to the search request; and a concentration layer for encoding dynamic pricing information, the concentration layer having more than one output, at least one output having a selection based on the predetermined taxonomy classification for selecting dynamic pricing information from a category in the predetermined taxonomy, the category having at least one sub-category in the taxonomy classification schema.

17. The system of claim 16 wherein the pointer to dynamic pricing information comprises a uniform resource locator (URL) address.

18. The system of claim 16 wherein the pointer to dynamic pricing information comprises a meta-tag.

19. The system of claim 16 wherein the pointer to dynamic pricing information comprises an index to a database of dynamic pricing information.

20. The system of claim 16 wherein the available items comprise goods or services or a combination of goods and services.

* * * * *